(12) United States Patent
Hayakawa

(10) Patent No.: US 9,245,134 B2
(45) Date of Patent: Jan. 26, 2016

(54) SYSTEM AND METHOD FOR TRANSMITTING IMAGE DATA

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 14/083,802

(22) Filed: Nov. 19, 2013

(65) Prior Publication Data

US 2014/0164436 A1  Jun. 12, 2014

(30) Foreign Application Priority Data

Dec. 10, 2012  (JP) ................................ 2012-269781

(51) Int. Cl.
*G06F 17/30* (2006.01)
*G06F 21/60* (2013.01)

(52) U.S. Cl.
CPC ........ *G06F 21/604* (2013.01); *G06F 17/30165* (2013.01); *G06F 17/30867* (2013.01); *G06F 2221/2113* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 2005/0015451 A1* | 1/2005 | Sheldon | H04L 51/12 709/206 |
| 2006/0190496 A1 | 8/2006 | Tsunoda | 707/200 |
| 2006/0230282 A1* | 10/2006 | Hausler | G06F 21/6218 713/182 |
| 2010/0174751 A1* | 7/2010 | Kawano | G06F 21/6218 707/784 |

FOREIGN PATENT DOCUMENTS

| | | |
|---|---|---|
| JP | 2006-229869 | 8/2006 |
| JP | 4174480 B | 8/2008 |

* cited by examiner

*Primary Examiner* — Anh Tai Tran
(74) *Attorney, Agent, or Firm* — Fitzpatrick, Cella, Harper & Scinto

(57) ABSTRACT

Provided are a unit that only outputs notification in the case where users having access have been added, a unit that saves image data in a restricted access save area without outputting notification, and a unit that outputs notification in a case where a specific pattern such as copyright information or confidential information was included in an original document that was read, and the user is notified by a combination of any of these three units.

12 Claims, 18 Drawing Sheets

---

USERS HAVING ACCESS HAVE BEEN ADDED AFTER IMAGE
TRANSMISSION WAS LAST PERFORMED.
THE ADDED USERS WILL ALSO HAVE ACCESS TO
THE IMAGE WHEN IT IS TRANSMITTED WITH THE CURRENT SETTINGS.
DO YOU WANT TO TRANSMIT THE IMAGE?

USERS ADDED AFTER IMAGE
TRANSMISSION WAS LAST PERFORMED:
   UserD
   UserE

OK      Cancel

FIG. 7A

| Private | Public |
|---------|--------|
| UserA   | UserA  |
|         | UserB  |
|         | UserC  |

FIG. 7B

| Private | Public |
|---------|--------|
| UserA   | UserA  |
|         | UserB  |
|         | UserC  |
|         | UserD  |
|         | UserE  |

FIG. 7C

| Private | Public |
|---------|--------|
| UserA   | UserA  |
|         | UserB  |

FIG. 7D

| Private | Public   |
|---------|----------|
| UserA   | All User |

FIG. 7E

| Private | Public |
|---------|--------|
| UserX   | UserX  |
|         | UserY  |
|         | UserZ  |

FIG. 10A

```
LOG IN

USERNAME:  UserA

PASSWORD:  ●●●●●●

| A | c | c | o | u | n | t | : |   |   |
|---|---|---|---|---|---|---|---|---|---|
| U | s | e | r | A |   |   |   |   |   |

[ ← ]  [ → ]  [ OK ]

| 1 | 2 ABC | 3 DEF |
|---|---|---|
| 4 GHI | 5 JKL | 6 MNO |
| 7 PQRS | 8 TUV | 9 WXYZ |
| * | 0 | # |

FIG. 10C

| P | a | s | s | w | o | r | d | : |   |
|---|---|---|---|---|---|---|---|---|---|
| * | * | * | * | * | * |   |   |   |   |

[ ← ]  [ → ]  [ OK ]

| 1 | 2 ABC | 3 DEF |
|---|---|---|
| 4 GHI | 5 JKL | 6 MNO |
| 7 PQRS | 8 TUV | 9 WXYZ |
| * | 0 | # |

FIG. 11A

```
THIS IS THE FIRST TIME TRANSMISSION OF
A READ IMAGE IS BEING PERFORMED.
THE FOLLOWING USERS WILL ALSO HAVE ACCESS TO
THE IMAGE WHEN IT IS TRANSMITTED.
DO YOU WANT TO TRANSMIT THE IMAGE?

USERS HAVING ACCESS:
        UserB
        UserC

[ OK ]    [ Cancel ]
```

FIG. 11B

```
USERS HAVING ACCESS HAVE BEEN ADDED AFTER IMAGE
TRANSMISSION WAS LAST PERFORMED.
THE ADDED USERS WILL ALSO HAVE ACCESS TO
THE IMAGE WHEN IT IS TRANSMITTED WITH THE CURRENT SETTINGS.
DO YOU WANT TO TRANSMIT THE IMAGE?

USERS ADDED AFTER IMAGE
TRANSMISSION WAS LAST PERFORMED:
        UserD
        UserE

[ OK ]    [ Cancel ]
```

FIG. 14A

| Private | Public | ATTRIBUTE |
|---|---|---|
| UserA | UserA<br>UserB<br>UserC | DIVISION CHIEF (ATTRIBUTE Lv3)<br>SECTION CHIEF (ATTRIBUTE Lv2)<br>SECTION CHIEF (ATTRIBUTE Lv2) |

FIG. 14B

| Private | Public | ATTRIBUTE |
|---|---|---|
| UserA | UserA<br>UserB<br>UserC | DIVISION CHIEF (ATTRIBUTE Lv3)<br>DIVISION CHIEF (ATTRIBUTE Lv3)<br>SECTION CHIEF (ATTRIBUTE Lv2) |

FIG. 14C

| Private | Public | ATTRIBUTE |
|---|---|---|
| UserA | UserA<br>UserB<br>UserC | DIVISION CHIEF (ATTRIBUTE Lv3)<br>DELETED (ATTRIBUTE Lv0)<br>SECTION CHIEF (ATTRIBUTE Lv2) |

FIG. 14D

| Private | Public | ATTRIBUTE |
|---|---|---|
| UserA | UserA<br>UserB<br>UserC<br>UserD | DIVISION CHIEF (ATTRIBUTE Lv3)<br>SECTION CHIEF (ATTRIBUTE Lv2)<br>SECTION CHIEF (ATTRIBUTE Lv2)<br>DIVISION CHIEF (ATTRIBUTE Lv3) |

FIG. 14E

| Private | Public | ATTRIBUTE |
|---|---|---|
| UserA | UserA<br>UserB<br>UserC<br>UserE | DIVISION CHIEF (ATTRIBUTE Lv3)<br>SECTION CHIEF (ATTRIBUTE Lv2)<br>SECTION CHIEF (ATTRIBUTE Lv2)<br>OFFICE STAFF (ATTRIBUTE Lv1) |

F I G. 16

```
       ┌─────────────────────────────────────────────────┐
       │ SETTING FOR WHEN THERE IS AN INCREASE IN        │
       │ USERS HAVING ACCESS TO THE Public DIRECTORY     │
4001 ──┼─● NOTIFY BEFORE TRANSMISSION                    │
4002 ──┼─○ TRANSMIT TO Private DIRECTORY                 │
       └─────────────────────────────────────────────────┘
```

FIG. 18

USERS HAVING ACCESS HAVE BEEN ADDED AFTER IMAGE
TRANSMISSION WAS LAST PERFORMED.
THE ADDED USERS WILL ALSO HAVE ACCESS TO
THE IMAGE WHEN IT IS TRANSMITTED WITH THE CURRENT SETTINGS.
● TRANSMIT TO Private DIRECTORY
○ TRANSMIT TO Public DIRECTORY USERS HAVING ACCESS ADDED AFTER LAST TIME:
 UserD
 UserE

[ OK ]  [ Cancel ]

F I G. 19
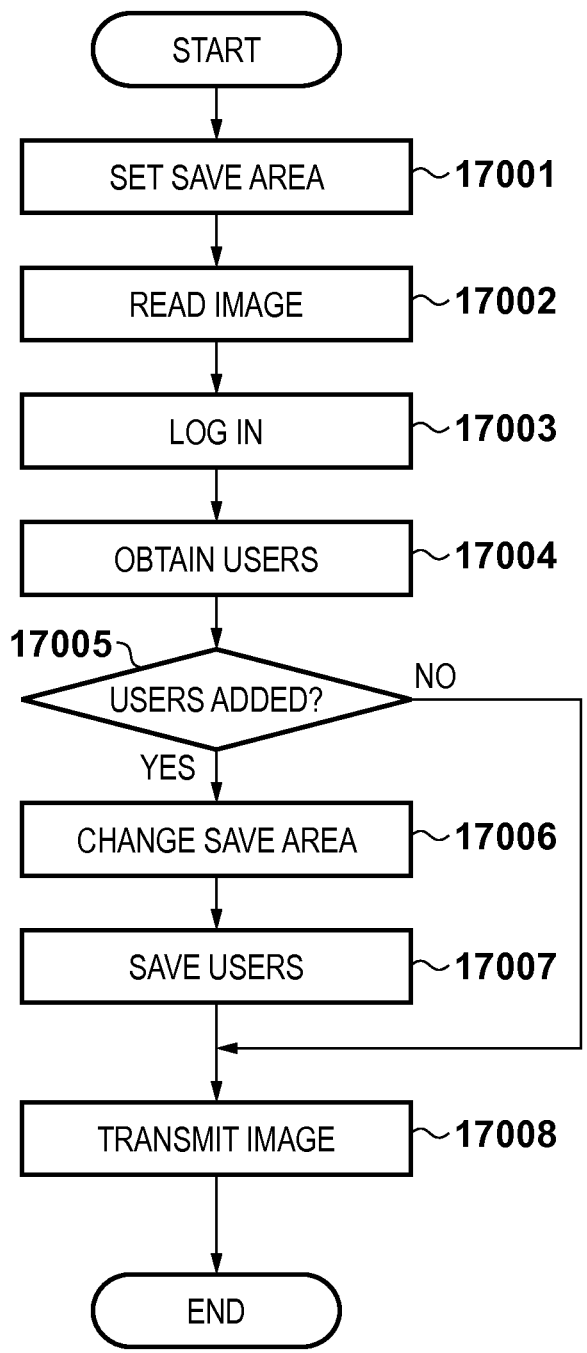

SYSTEM AND METHOD FOR TRANSMITTING IMAGE DATA

BACKGROUND OF THE INVENTION

1. Field of the Invention

The present invention relates to information processing technology for transmitting image data to a storage apparatus.

2. Description of the Related Art

In recent years, it has become popular to transmit image data read with an image reading apparatus to a storage server on an external network and save the image data on the storage server. This storage server can be set to share image data with only specified users by configuring the settings so that only specified users have access, or to share image data with unspecified users by configuring the access settings so that anyone has access.

Here, the prior agreement of the user is required as to the settings of the storage area on the storage server to which image data read by an image reading apparatus is to be transmitted, such as whether the storage area will be set so that unspecified users have access (storage area set to unlimited access), or whether the storage area is set so that access is limited to specified users, for example. This is also because of the possible infringement of security, privacy, copyright and the like (hereinafter, "security and the like") related to an image, if an image that was not meant to be made available to unspecified persons is stored in a storage area set to unlimited access.

However, image data may also be stored without the user knowing that the access range settings of the storage server have been changed. Infringements such as the above can occur if such a situation arises.

It is desirable to prevent such situations. Technology for notifying a user that the settings have been changed without the user's knowledge has been proposed (e.g., see specification of Japanese Patent No. 4174480, etc.). In the specification of Japanese Patent No. 4174480, in order to prevent an MFP transmitting image data or the like to the wrong destination, registered destination information is checked prior to transmission to that destination, and if the information has been updated after transmission was last performed to that destination, the user is notified of the change.

Even when the access range settings of the storage area are thus checked prior to storing data, there is a problem in that even though the user does not need to be notified in the case where the settings are changed to limit access since there is no possibility security or the like being infringed, the user will be notified whatever the change according to the technology disclosed in the specification of Japanese Patent No. 4174480.

Even when a user that has received notification that the settings have been changed returns the settings to their original state, for example, a further notification will be issued as a result of that change according to the technology of the specification of Japanese Patent No. 4174480.

Furthermore, in order to notify a user, the image reading apparatus needs to be provided with means for that purpose, and performing such notification with a simple image reading apparatus is problematic.

SUMMARY OF THE INVENTION

The present invention has been made in view of the above conventional technology, and provides an image transmission apparatus and an image transmission method that are able to perform necessary notification without depending on the configuration of an image reading apparatus, and an image saving system.

According to one aspect, the present invention has the following configuration. There is provided a system for transmitting image data to a server for saving image data into a save area, comprising: an obtainment unit configured to obtain from the server before transmitting image data to the server, a current access restriction setting of a save area chosen by a user who is a transmitter of the image data, the save area being accessible by users specified based on an access restriction setting; a notification unit configured to compare a previous access restriction setting with the current access restriction setting, and output notification to the user if the current access restriction setting is less restrictive than the previous access restriction setting; and a transmission unit configured to transmit the image data to the server.

Alternatively, according to another aspect, the present invention has the following configuration. There is provided a method for transmitting image data to a server for saving image data into a save area, the method comprising: obtaining from the server before transmitting image data to the server, a current access restriction setting of a save area chosen by a user who is a transmitter of the image data, the save area being accessible by users specified based on an access restriction setting; comparing a previous access restriction setting with the current access restriction setting; outputting notification to the user if the current access restriction setting is less restrictive than the previous access restriction setting; and transmitting the image data to the server.

According to the present invention, in the case where the access range settings of the area for saving image data are less restrictive than last time, the inadvertent release of image data can be prevented by notifying the user or changing the save area to an area having a more limited access range. Also, unnecessary notification is avoided by performing notification or the like in the case where the access range changes to become less restrictive, rather than merely if there has been a change.

Further features of the present invention will become apparent from the following description of exemplary embodiments with reference to the attached drawings.

BRIEF DESCRIPTION OF THE DRAWINGS

FIGS. 7A to 7E are diagrams for illustrating users having access according to an embodiment.

FIGS. 10A to 10C are diagrams of UIs for allowing a user to log in according to Embodiment 1.

FIGS. 11A and 11B are diagrams of UIs for notifying a user in Embodiment 1.

FIGS. 14A to 14E are diagrams of users having access for illustrating Embodiment 3.

FIG. 16 is a diagram illustrating a method for allowing a user to select an operation according to Embodiment 4.

FIG. 18 is a diagram of a UI for notifying a user according to Embodiment 5.

FIG. 19 is a flowchart for illustrating Embodiment 6.

DESCRIPTION OF THE EMBODIMENTS

Hereinafter, embodiments for carrying out the present invention will be described in detail. Note that the following embodiments do not limit the present invention according to the claims, and all combinations of the features described in the embodiments are not necessarily essential to means for solving the problems of the present invention.

Embodiment 1

Configuration of Storage System

Figure 1:
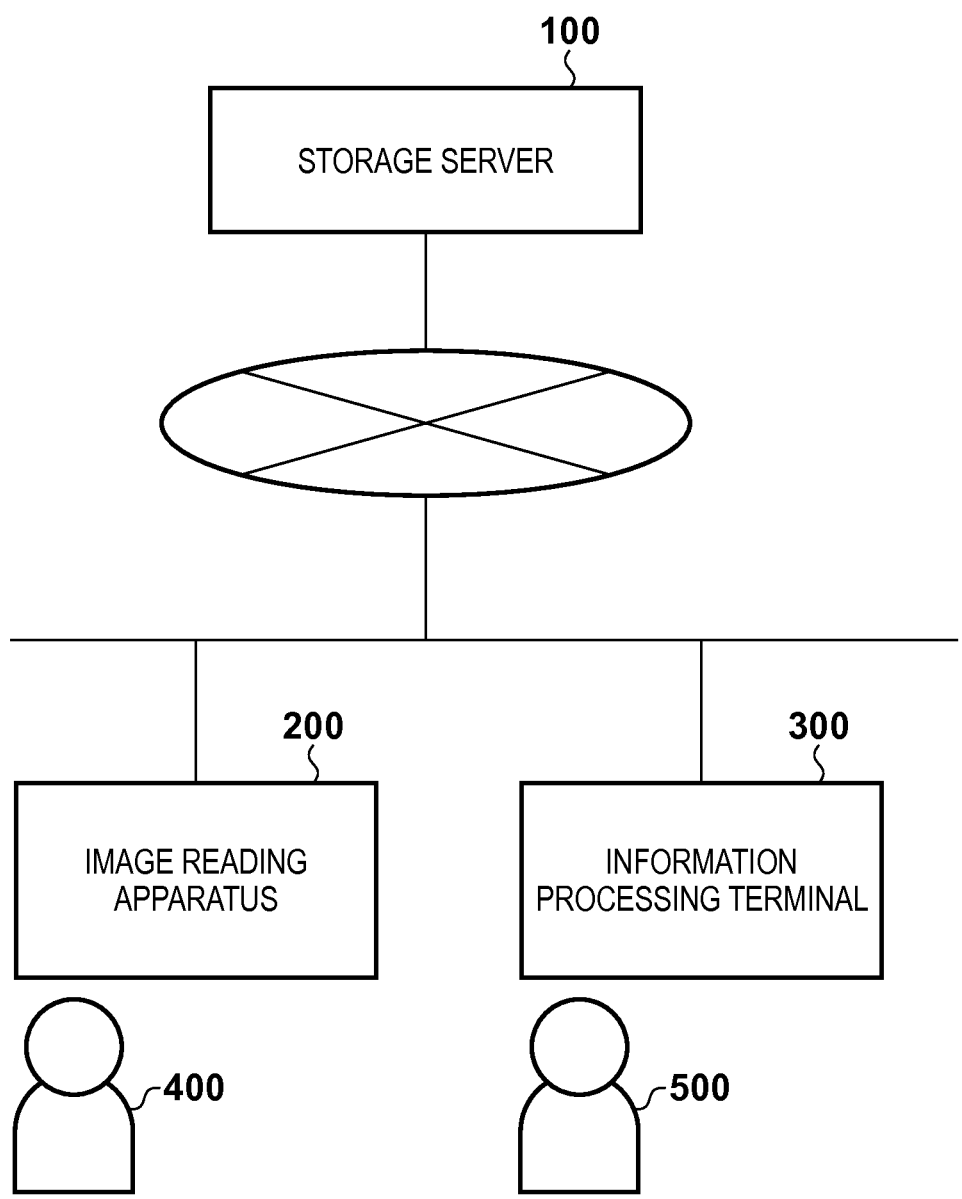
FIG. 1 is a diagram of a configuration of a storage system for illustrating an embodiment.

A configuration of the present embodiment is shown in FIG. 1. A storage server 100 is connected to an external network such as the Internet, for example, and is accessible from outside. An image reading apparatus 200 such as a digital multifunction peripheral, and an information processing terminal 300 such as a general-purpose computer, for example, are likewise connected to the external network. The image reading apparatus 200 is operated by a user 400 and is capable of transmitting read image data to the storage server 100. Also, the information processing terminal 300 is operated by a user 500, and is capable of controlling the image reading apparatus 200, receiving image data read by the image reading apparatus 200, and transmitting the image data to the storage server 100. Note that the user 400 and the user 500 may be the same user. Here, the storage server 100 may also be constituted by a plurality of servers. The external network can also be an intranet, for example.

The system in FIG. 1 is an overall image saving system, and can also be referred to as an image transmission system in which the image reading apparatus 200 and the information processing apparatus 300 excluding the storage server 100 together implement an image transmission method. This image transmission system can be realized with a combination of a plurality of apparatuses such as in the embodiments, but can also be realized with only an information processing apparatus or only an image reading apparatus.

Figure 2:
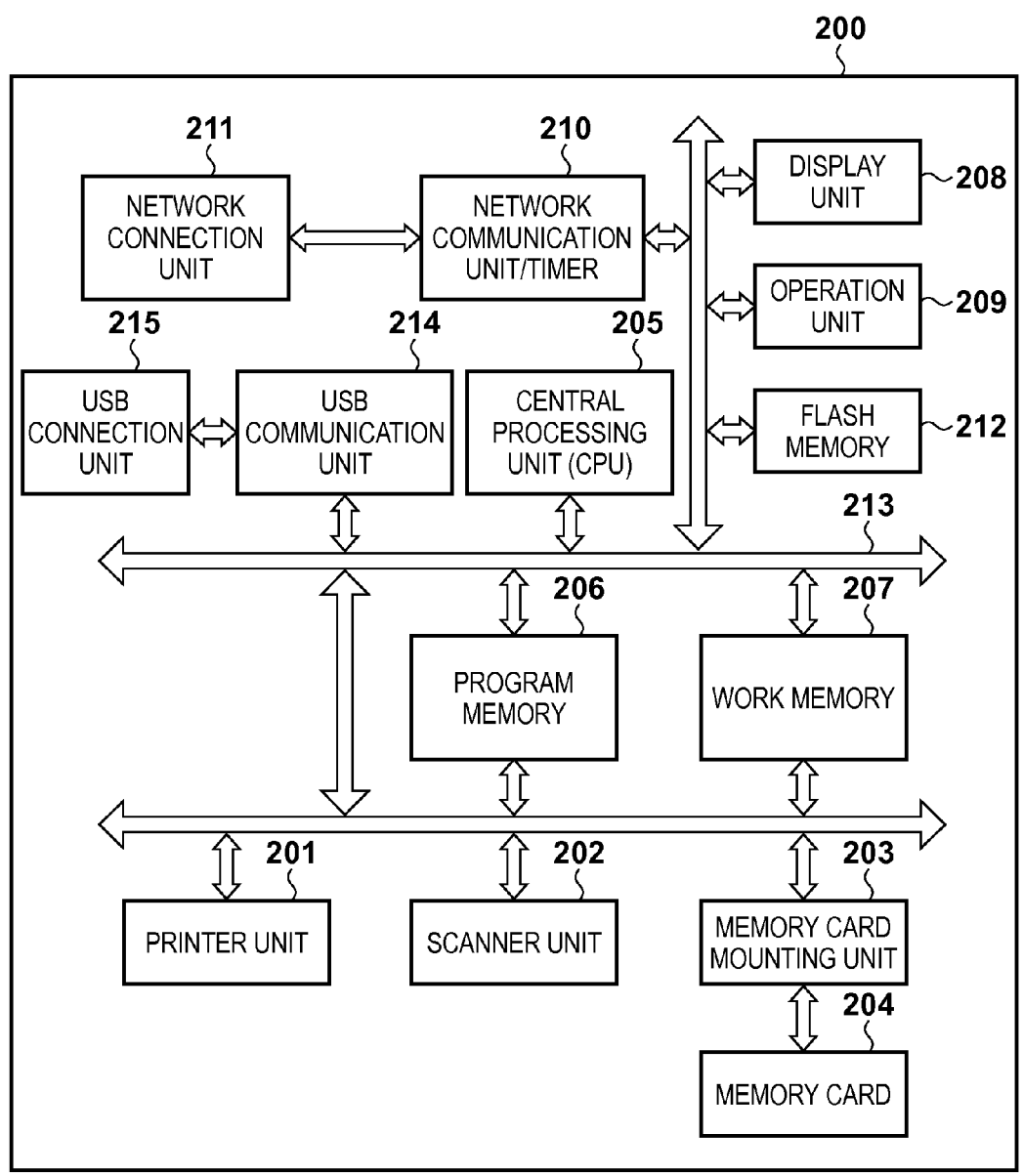
FIG. 2 is a diagram of a configuration of an image reading apparatus for illustrating an embodiment.

FIG. 2 is a block diagram showing a schematic configuration of the image reading apparatus 200 which is a typical embodiment to the present invention. The image reading apparatus 200 is a so-called multifunction peripheral provided with a printer function and a scanner function, and is able to provide services using the respective functions via a network.

In the image reading apparatus 200, the printer function is realized with a printer unit 201 and a scanner function is realized with a scanner unit 202. The printer unit 201 prints data such as print data received from outside or image data stored on a memory card 204 connected via a memory card mounting unit 203 to printing sheets using printing methods such as an inkjet method or an electrophotographic method. The scanner unit 202 optically reads an original document set on a platen and converts the original document to electronic data, and further converts the electronic data to image data in a specified file format and transmits the image data to an external apparatus such as the storage server 100 or the information processing apparatus 300, for example, via a network.

Furthermore, the image reading apparatus 200 is provided with a central processing unit 205 for controlling the functional units, and a program memory 206 such as a ROM that stores program code or the like that is read out by the central processing unit 205. Also, the image reading apparatus 200 is provided with a work memory 207 such as a RAM for temporarily storing or buffering image data or the like during execution of the respective services, a display unit 208 such as an LCD, and an operation unit 209 consisting of switches.

The image reading apparatus 200 is also provided with a network communication unit 210 for connecting the image reading apparatus 200 to a network and performing various types of communication, and a network connection unit 211 for connecting the network communication unit 210 to a network medium. The network communication unit 210 supports at least one of wired LAN and wireless LAN. In the case of supporting wired LAN, the network connection unit 211 is a connector for connecting a cable of the wired LAN to the image reading apparatus 200, and, in the case of supporting wireless LAN, the network connection unit 211 is an antenna. It should be obvious that wired LAN and wireless LAN are exemplary networks, and the network communication unit 210 may alternatively or additionally support other networks.

Furthermore, in order to store transmission source information of packets received by the network communication unit 210, the image reading apparatus 200 is provided with a memory 212 such as a nonvolatile flash memory.

Furthermore, the image reading apparatus 200 is provided with a USB communication unit 214 for communicating with an information processing apparatus via a USB (Universal Serial Bus) interface, and connects to the information processing apparatus from a USB connection unit 215 realized by a USB connector or the like. The functional units described above are connected by a signal line 213.

Figure 3:
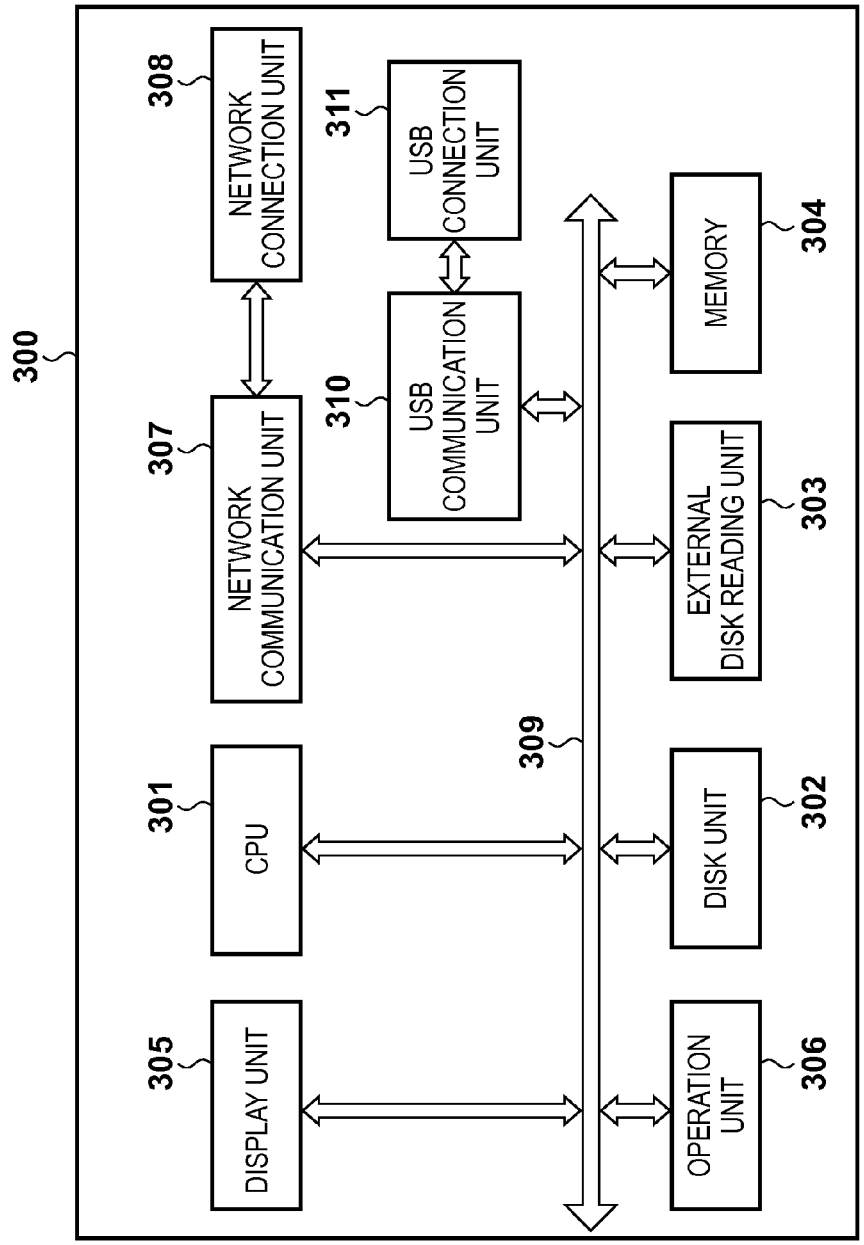
FIG. 3 is a diagram of a configuration of an information processing apparatus for illustrating an embodiment.

FIG. 3 is a block diagram showing a schematic configuration of the information processing apparatus 300 which is a typical embodiment of the present invention. In FIG. 3, a CPU 301 is a processing unit for controlling the units of the information processing apparatus 300. A disk unit 302 is a file storage such as a disk apparatus, for example, that has application programs that are read out by the CPU 301, an OS (Operation System) and the like installed thereon, and stores various types of files and the like. An external disk reading unit 303 is an external disk reading unit for reading out the contents of an external storage medium such as a CD-ROM, and a memory 304 is a memory for the CPU 301 to perform temporary storage, buffering or the like of data if needed. A display unit 305 is a display unit consisting of an LCD or the like that displays user interface screens and the like, and an operation unit 306 is an operation unit realized by a keyboard, a mouse, a touch panel, or the like. A network communication unit 307 connects the information processing apparatus 300 to a network, and performs various types of communication. A network connection unit 308 is a connection unit for connecting the network communication unit 307 to a network medium.

Similarly to the image reading apparatus 200, the network communication unit 307 and the network connection unit 308 support at least one of wired LAN and wireless LAN. As for specific configurations thereof, required functions and configurations are adopted according to the supported LAN, similarly to the network communication unit 210 and the network connection unit 211 built into the image reading apparatus 200. A bus 309 is a signal line for connecting the units. A USB communication unit 310 is a USB communication unit for communicating with various types of peripheral apparatus via a USB interface, and a USB connection unit 311 is a USB connector or the like.

Software for Controlling Image Reading Apparatus

Figure 4:
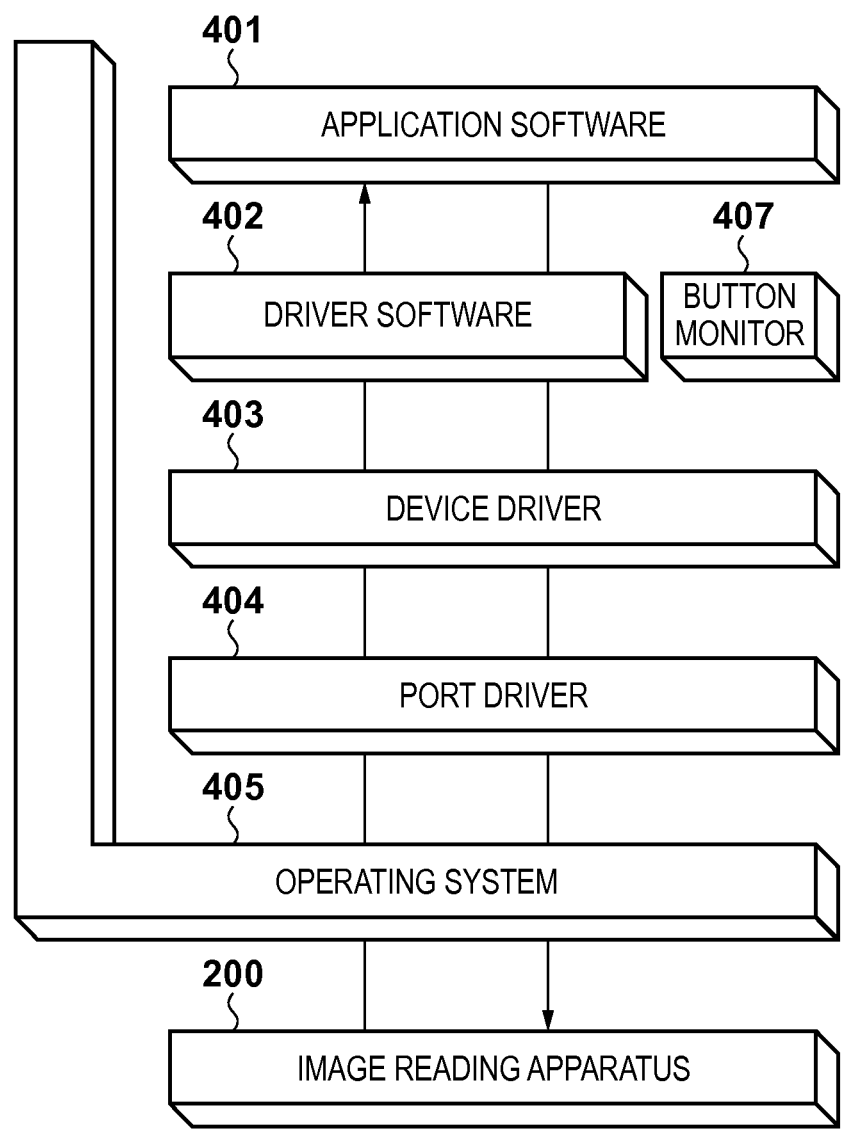
FIG. 4 is a diagram of a software configuration for illustrating an embodiment.

FIG. 4 is a diagram showing the software structure of the information processing apparatus 300 for controlling the image reading apparatus 200. Application software 401 designates scan settings such as the scan method, color settings and resolution settings and instructs driver software 402 to obtain an image, using TWAIN, WIA or an application programming interface (API) based on specifications proprietary to the vendor. Note that WIA is an image input API that comes standard with Microsoft Windows (registered trademark) operating systems from Windows Me onwards. Also, the application software 401 has a function of setting the functions of the operation unit 209 of the image reading apparatus 200 and a function of saving files in various formats. The driver software 402 is also able to pass images obtained from the image reading apparatus 200 to the application software 401, and to display proprietary GUIs (graphic user interfaces). GUIs displayed by the driver software 402 provide a user with functions such as a preview function, a function of designating an area to be cropped in a preview image, a resolution setting function, a reading mode (binary, 8-bit multi-value, 24-bit multi-value, etc) setting function, a function of setting color adjustment such as gamma correction, and the like. A device driver 403 sends control commands for controlling the program memory 206 mounted in the image reading apparatus 200 to the image reading apparatus 200, and performs image obtainment. In the case where firmware is not installed on the image reading apparatus 200, the device driver 403 accesses a control register of each module of the image reading apparatus 200, and performs flow control for controlling shading, setting the motor speed according to the resolution and the cropping range, performing processing for transmitting gamma correction data received from the driver software 402 to the image reading apparatus 200, and performing image reading. A port driver 404 performs communication control with the image reading apparatus 200 according to an interface such as a parallel, USB, IEEE 1394, SCSI, LAN or wireless LAN interface. An operating system (OS) 405 is an operating system (OS) of the information processing apparatuses 300 such as Windows (registered trademark). A button monitor 407 is a module for detecting that a button in the operation unit 209 of the image reading apparatus 200 has been pressed and what button was pressed, and monitors whether a button has been pressed, at fixed time intervals. The button monitor 407, on detecting that a button has been pressed, notifies information on the pressed button to the application software 401. The application software 401, having received the notification, performs image reading based on a condition set for each button.

Figure 5:
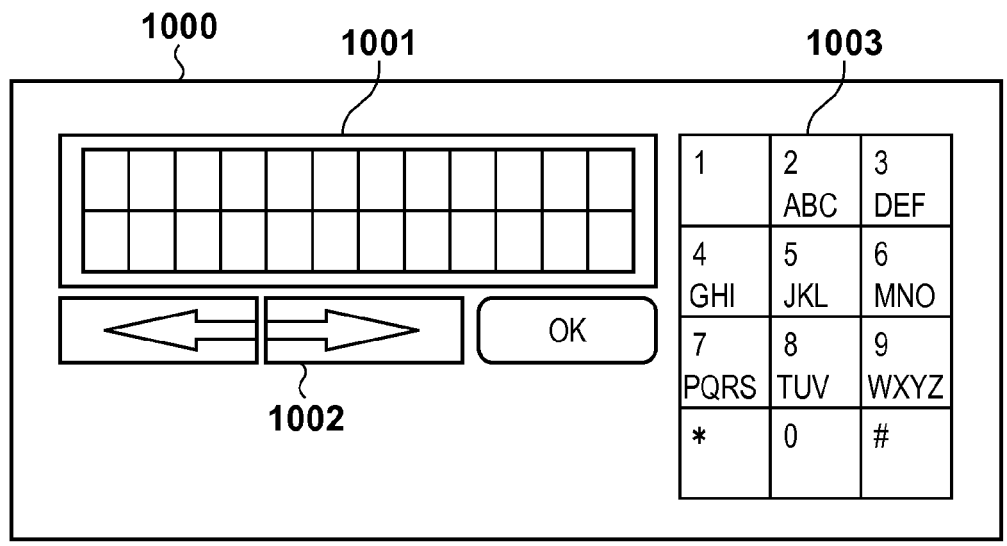
FIG. 5 is a diagram of an operation panel of the image reading apparatus for illustrating an embodiment.

An operation panel of the image reading apparatus that is constituted by a display unit 208 such as LCD and an operation unit 209 that consists of switches is shown in FIG. 5. An operation panel 1000 is mounted in the image reading apparatus 200 so as to be operable by an operator, and a display unit 1001 for displaying reading settings, information and the like is mounted on the operation panel 1000. Although the display capability of this display unit 1001 differs depending on the model of image reading apparatus, the display unit envisaged in the present embodiment is a so-called character LCD that is able to display a plurality of lines of preset alphanumeric characters, symbols or the like. Also, after reading settings or the like have been changed or configured using operation keys 1002 or a numeric keyboard 1003, an image is read and read image data is transmitted to the external storage server 100. Note that "operator" denotes the user that operates the information processing apparatus 300 or the image reading apparatus 200 to read images and save read images to the storage server 100, and is assumed in the present embodiment and subsequent embodiments to be one and the same as the user that logs into the storage server 100, that is, the login user.

Directory Configuration of External Storage Server

Figure 6:
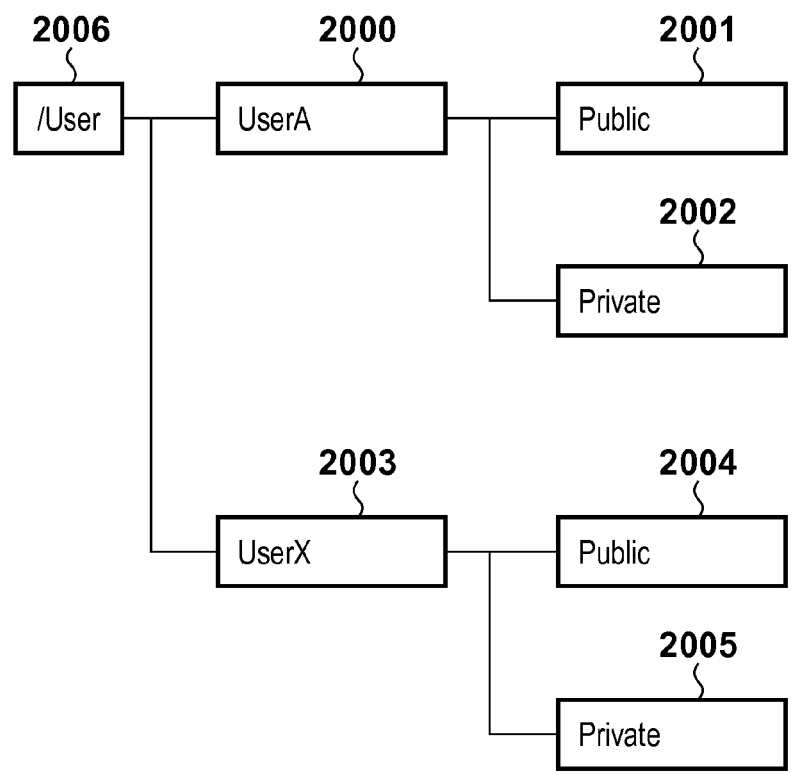
FIG. 6 is a diagram of an internal directory for illustrating an embodiment.

The configuration of the storage area, that is, the file directory, on the external storage server 100 is shown in FIG. 6. The directory is also called a folder. In the external storage server 100, the directory is divided per user, and a user is able to control access by other users through user settings. For example, a directory 2000 is allocated to a user called User A under a directory 2006, and a public (Public) directory 2001 that can be accessed by other users and a private (Private) directory 2002 that only User A can access have been set as subdirectories. Note that in the present embodiment and subsequent embodiments, "accessible" denotes that access is possible due to access rights having been set and access being permitted, rather than for a technical reason such as connection being up or down. Access management information that is used for management of access rights set for the public directory and private directory of each user is saved in the respective directories. The access management information saved in each directory is also used in order to specify users that can access the directory. Note that access management information may also be collectively saved in one save location.

A directory 2003 is allocated under the directory 2006 to a user called User X that is different from User A, and a public directory 2004 that is accessible by other users and a private directory 2005 that only User X can access are set. The login username (hereinafter, account name) and password set for User X are completely different from User A. In this way, according to the configuration of the present embodiment, since a system is built in which users are managed independently, a secure system with enhanced security and that enables user-specific management can be realized.

Hereinafter, an example using the account name and password of User A will be described, but it is also possible to utilize this system using the account name and password of User X or other users.

Access Authority of External Storage Server

The access authority of the external storage server 100 is shown in FIGS. 7A to 7E. FIGS. 7A to 7E show usernames having access authority for each of the subdirectories "Private" and "Public" under the directories of individual users. In FIG. 7A, it is shown that the private directory 2002 allocated to User A is accessible only by User A, and that the public directory 2001 allocated to User A is accessible by User A, User B and User C. According to this configuration, image data saved in the private directory 2002 allocated to User A is accessible by only User A and cannot be accessed by other users such as User B or User C, for example. On the other hand, image data saved in the public directory 2001 allocated to User A is also accessible by User B and User C besides User A. By thus saving read image data in the public directory, a plurality of users are able to share that image data. Note that it is assumed for the purpose of description that access authority to the private directory 2002 allocated to User A enables access by only User A, and that there can be no increase or decrease in users having access. However, depending on the specifications of the external storage server, even if the mechanism for a private directory is not provided, a user having an account is able to substantively realize a private directory by setting himself or herself as the only user having access to the directory allocated to himself or herself, and not changing the access authority. Even in the case where a directory called a private directory is thus not provided, a directory set to a limited access restriction such that only the user of the account has access will substantively be handled similarly to a private directory of the present embodiment.

In FIG. 7B, User D and User E have been added as users having access, and User D and User E can also access the public directory 2001 allocated to User A. In FIG. 7C, users having access have decreased, and, other than User A, User B can access the public directory 2001 allocated to User A. Also, also apart from individually designating users having access, it is possible to make saved image data available without limiting users, by setting a special unlimited access restriction such as All User, as shown in FIG. 7D. For example, the public directory 2001 allocated to User A, if set as shown in FIG. 7B, will be a public directory to which users having access is limited, and, if set as shown in FIG. 7D, will be a public directory to which users having access are not limited and anyone has access.

In FIG. 7E, the access rights of the private directory 2005 and the public directory 2004 of the user called User X that is different from User A are shown.

Procedure when Saving Data

Figure 8:
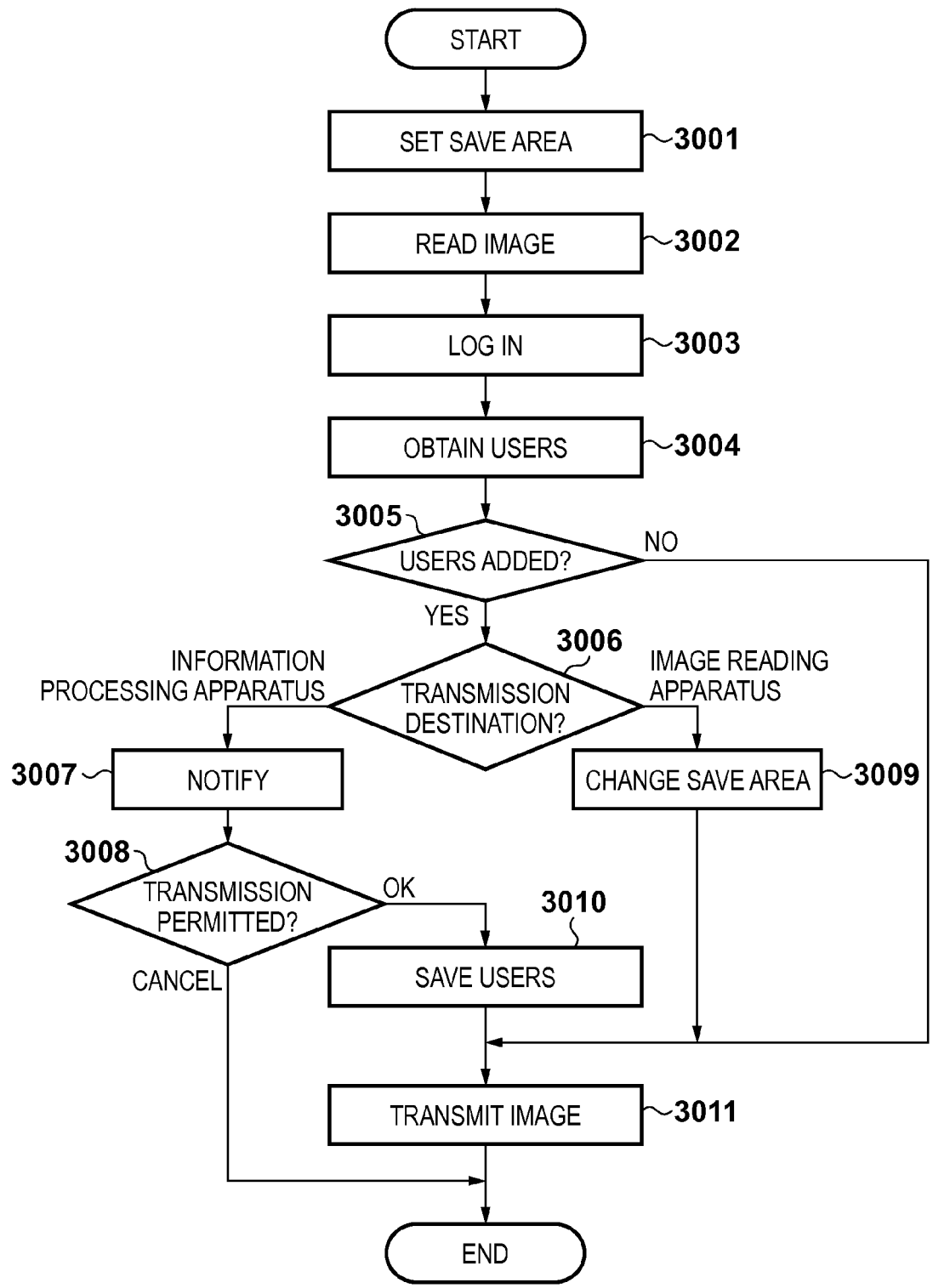
FIG. 8 is a flowchart for illustrating Embodiment 1.

The processing of the present embodiment will now be described using the flowchart of FIG. 8. The flow of FIG. 8 can be realized by the information processing apparatus 300 executing a program obtained by encoding the procedure of FIG. 8. In the case where, however, the apparatus that is operated by the user is the image reading apparatus 200, the image reading apparatus 200 executes steps 3001 to 3003. The remaining steps are then executed by the information processing apparatus 300. In the case where the apparatus that is operated by the user is the information processing apparatus 300, the information processing apparatus 300 executes the entire procedure of FIG. 8. Note that it is assumed that the transmission destination of image data is the storage server 100, and the directories thereof have a hierarchical structure for each user such as shown in FIG. 6.

Figure 9A:
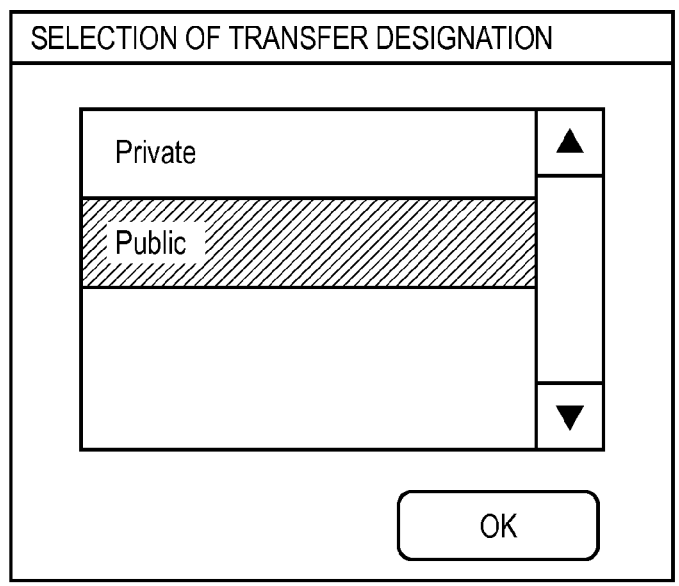
FIGS. 9A and 9B are diagrams of UIs for allowing a user to select a save location according to Embodiment 1.

At step 3001, according to the designation of the save location of a read image by the user, an identifier indicating the designated save location, such as the network address of the storage server 100 or an identifier indicating the directory, for example, is stored in the disk unit 302, the flash memory 212 or the like, for example. In the case where the apparatus targeted for operation by the user is the information processing apparatus 300, the user operates the operation unit 306 and sets the save location via a settings screen displayed as shown in FIG. 9A on the display unit 305. In FIG. 9A, "Public" is shown as selected by being displayed in a highlighted (reversed) manner. The save location can be set to Public if the "OK" button is pressed in this state. If Public has been set here, the public directory, which is a subdirectory of the user directory secured in advance in the storage server 100 for the login user that is operating the information processing apparatus 300, is determined as the save location of image data, and information for specifying the save location is stored. In the case where Private is selected, "Private" need only be read for "Public" in the above description.

Figure 9B:
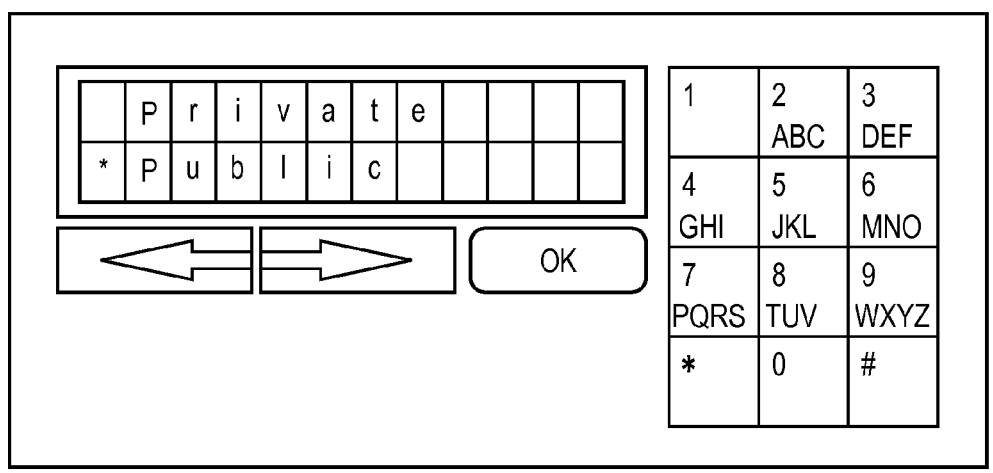

On the other hand, in the case where the apparatus targeted for operation by the user is the image reading apparatus 200, the operator operates the operation unit 209 and sets the save location via a settings screen displayed as shown in FIG. 9B on the display unit 208. In FIG. 9B, "Public" is shown as selected by adding "*" in front thereof, and the save location can be set to Public by pressing the "OK" button in this state. A button operation of this image reading apparatus 200 is detected by the button monitor 407 of the information processing apparatus 300, and the application software 401 is launched. Also, the set save location is transmitted to the information processing apparatus 300, and is saved by the application software 401, for example, in an area that can be accessed thereby.

At step 3002, in the case where the apparatus targeted for operation by the user is the information processing apparatus 300, the application software 401 and the driver software 402 cause an original document set in the image reading apparatus 200 to be read, and obtain image data. For this purpose, a read command is sent from the information processing apparatus 300 to the image reading apparatus 200 in response to an instruction to start reading by the operator, for example, and the read image is saved in the disk unit 302. On the other hand, in the case where the apparatus targeted for operation by the user is the image reading apparatus 200, reading of the original document is started in response to an instruction to start reading, for example, and the read image data is transmitted to the information processing apparatus 300. In the information processing apparatus 300, the image data received by the launched application software 401 is saved.

At step 3003, the operator logs in using the information processing apparatus 300 or the image reading apparatus 200 as a terminal, so as to be able to access to the external storage server 100. In the case of transmitting image data from the information processing apparatus 300, the operator operates the operation unit 306 and inputs a username (account name) and a password via the login screen displayed as shown in FIG. 10A on the display unit 305. Also, in the case of performing image reading from the image reading apparatus 200, the operator operates the operation unit 209, inputs a username (account name) via a login screen displayed as shown in FIG. 10B on the display unit 208, and then inputs a password via a password input screen displayed as shown in FIG. 10C. In the following description, it is assumed that the operator has successfully logged in as "User A". On the other hand, login operations and login success by the image reading apparatus 200 are monitored by the button monitor 407, the input account name and password are transferred to the information processing apparatus 300, and a login procedure is executed. In the present embodiment, the login procedure is carried out between the information processing apparatus 300 and the storage server 100, irrespective of which apparatus the operator perform the login operation from. That is, the apparatus that is able to access the storage server 100 after login is the information processing apparatus 300. If login is successful, the processing from step 3004 is executed by the application software 401.

The information processing apparatus 300 performs the processing from step 3004 onwards. At step 3004, the application software 401 obtains the access range settings of the directory designated as the save location, that is, the users registered as users having access. The access range settings are also called access restriction settings. The obtainment of users registered as users having access is also processing, performed by the application software 401, for obtaining access management information and obtaining a list (user list) of users having access that are specified by this access management information. In the case where the private directory was designated at step 3001, a list of user that have access to the private directory in FIGS. 7A to 7E is obtained. In the case where the public directory was designated at step 3001, a list of user that have access to the public directory in FIGS. 7A to 7E is obtained.

At step 3005, the application software 401 investigates whether any users having access have been added after image data was last transmitted. This check is performed by storing a list of users that had access when image data was last transmitted in the transmission destination directory as a transmission record, and comparing this list with the list of users that currently have access to the directory. Since there is, however, no last transmission record when performing image transmission for the first time, the login user is assumed to be the only user that had access, and comparison is performed with the list of users that are currently set as having access. It is assumed that the save location of the last transmission record is the login user's private directory secured in the storage server 100. At step 3005, the last transmission record is read from the private directory, and it is investigated whether any users having access to the directory serving as the transmission destination have been added. The last transmission record includes at least the access range settings (e.g., usernames of users having access rights, etc.) of the directory serving as the transmission destination.

For example, when the users permitted access change from FIG. 7A to FIG. 7B or FIG. 7D, the determination result of step 3005 is Yes since users have been added, and the processing advances to step 3006. On the other hand, in the case where there is a change from FIG. 7A to FIG. 7C, the determination result is No since users having access have decreased, and the processing advances to step 3011. Also, if the public directory, which is set to be accessible by users besides the login user, is designated as the transmission destination when performing image transmission for the first time, the determination result of step 3005 will be Yes, and the processing advances to step 3006. Also, in the case where the private directory was designated at step 3001, the determination result is No since the login user is the only user having access at the time of the current transmission, and the processing advances to step 3011. In the processing of this step 3005, the determination is performed in consideration of the case where persons that were not users last time have been added, rather than simply investigating the increase or decrease in the number of users. Accordingly, even if some of the users that had access when transmission was last performed have been deleted, it is determined that users have been added in the case where new users have been added, and the processing branches to step 3006. In this way, if the users having access that are included in the last transmission record and the users having access to the directory that were obtained this time are in both lists of usernames, and if there is a username that is included in only the latter list, it is determined that new users have been added. Also, in the case where the users having access are defined by comprehensive description showing a user range, the inclusion relation is predefined within the user range, for example, and the determination can be performed using this inclusion relation. For example, if the last transmission record includes description defining all users as the range of users having access as shown in FIG. 7D, it will not be determined that new users have been added under any circumstances, and if description targeting all users as the users having access that were obtained at step 3004 is included, it will be determined that new users have been added, except for the case where the last transmission record includes description targeting all users.

At step 3006, the application software 401 determines whether the user read the image using the information processing apparatus 300 or using the operation panel of the image reading apparatus 200 at step 3002. In the case where the application software 401 was itself operated by the user and read the image under the control by the information processing apparatus 300, the processing advances to step 3007. In the case where the operation panel 209 of the image reading apparatus 200 was operated by the user, and the application software 401 was launched as a result of the user operation and read the image, that is, in the case of a push scan, the processing advances to step 3009. The processing of step 3006 can be realized by storing information indicating that there has been a login operation in the case where the button monitor 407 detects a login operation in the image reading apparatus 200, for example, and performing the determination based on whether or not this information is stored.

At step 3007, the application software 401 outputs (in the present example, displays) notification to the operator on the display unit 305. An example of the notification that is displayed on the display of the information processing apparatus when the public directory is designated at the time of image transmission being performed for the first time is shown in FIG. 11A. Also, an example of the notification that is displayed on the display of the information processing apparatus 300 when the users having access change from FIG. 7A to FIG. 7B is shown in FIG. 11B. The user receives this notification, and presses OK in the case of wanting to perform transmission even though users having access have been added, and Cancel in the case of cancelling transmission.

At step 3008, it is determined what button was pressed by the operator that received the notification displayed at step 3007. In the case where the OK button was pressed, the processing advances to step 3010, and in the case where the Cancel button was pressed, the processing is ended.

At step 3009, the application software 401 automatically changes the save location to the private directory. Thereby, even if the display unit 1001 of the image reading apparatus 200 does not have the display capability to be able to sufficiently notify the operator, confidentiality can be maintained by performing transmission to the private directory which can only be accessed by the user.

At step 3010, the application software 401 saves access management information showing the list of users having access that was obtained at step 3004 in the private directory on the external storage as a transmission record. The saved transmission record is referred to at step 3005 as the record transmitted last time, when data is next saved in this directory. By thus saving the record transmitted last time on the external storage, the same transmitted record can be used, even in the case where the user performs operations from another information processing apparatus not shown or where the user performs operations from another image reading apparatus not shown.

At step 3011, the application software 401 transmits image data to the directory that has been set. In the case where the processing does not pass through step 3009, the image data is transmitted to the directory that was set at step 3001. In the case where the processing passes through step 3009, the image data is transmitted to the private directory that was set at step 3009.

Note that in the case where the private directory is designated as the transmission destination at step 3001, a configuration can be adopted in which the determination result of step 3005 is always No, and the processing of step 3004 is omitted.

Note that although the application software 401 and the driver software 402 that operate on the information processing apparatus 300 performed all of the image reading, saving and transmission processing, it is also possible to use the central processing unit 205, the program memory 206 and the work memory 207 mounted in the image reading apparatus 200, and to perform part or all of the processing with the image reading apparatus.

Note that although the list of users having access is saved in the private directory of the storage server 100 at step 3010, this is for the convenience of having one list of users approved by the user that is logged, irrespective of what information processing apparatus or image reading apparatus is being used, and the determination of step 3005 can be executed, even if the user list is saved in the image reading apparatus 200 or in the information processing apparatus 300.

According to the above description, before saving image data in a designated directory of the storage server 100, it is determined whether any new users that were not set when image data was saved in the directory last time have been added, and if new users have been added, the operator is notified, and the image data is transmitted and saved after receiving approval from the operator. Saving of the image data in a directory whose access range has been made less restrictive without the user's knowledge can thus be prevented. Also, in the case where difficulties in performing this notification are anticipated, that is, in the case where the operator reads image data by operating the image reading apparatus, the read image data is transmitted to the private directory. This enables erroneous transmission of image data to be prevented, without relying on the functions of the image reading apparatus.

Furthermore, in the case where image data is usually transmitted to the private directory, and the operator tries to transmit image data after mistakenly selecting the public directory, the users having access last time that were saved at step 3010 are compared with the list of the users having access that was obtained at step 3004, and since it is determined at step 3005 that new users have been added, erroneous transmission can be prevented by notifying the user and performing transmission only in permitted cases.

Embodiment 2

Figure 12:
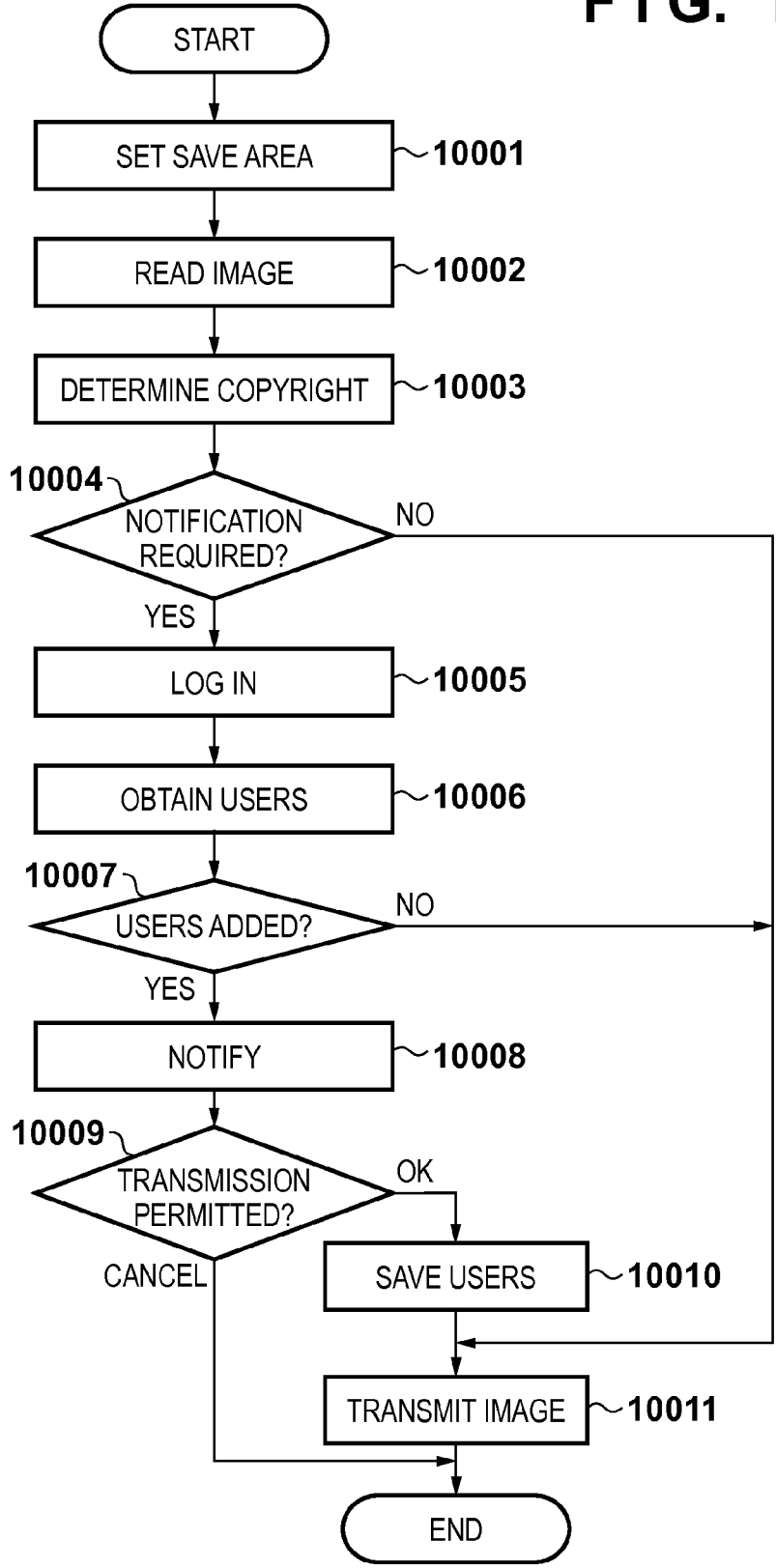
FIG. 12 is a flowchart for illustrating Embodiment 2.

The configuration of the present embodiment is similar to Embodiment 1, and description thereof will thus be omitted. In the present embodiment, copyrighted material is read, and if there is a problem with the resultant image data being released, this is notified and release of the image data is forestalled. The processing of the present embodiment will now be described with reference to the flowchart of FIG. 12. Also, the present embodiment is similar to Embodiment 1 in that the login operation and the settings of the save area can be performed from both the image reading apparatus 200 and the information processing apparatus 300, and in that the information processing apparatus 300 performs access to the storage server 100 even in the case where the user performs operations from the image reading apparatus 200. In the following description, steps that are not described as being unique to the present embodiment are similar to corresponding steps in Embodiment 1. Accordingly, description of those steps will be simplified.

At step 10001, the operator designates the save location of a read image. In the case where an image is read from the information processing apparatus 300, the operator operates the operation unit 306 and sets the save location via a settings screen displayed as shown in FIG. 9A on the display unit 305. In FIG. 9A, "Public" is shown as selected by being displayed in a highlighted manner, and the save location can be set to Public by pressing the "OK" button in this state.

In the case of performing image reading from the image reading apparatus 200, the operator operates the operation unit 209 and sets the save location via a settings screen displayed as shown in FIG. 9B on the display unit 208. In FIG. 9B, "Public" is shown as selected by adding "*" in front thereof, and the save location can be set to Public by pressing the "OK" button in this state.

At step 10002, the application software 401 and the driver software 402 read an original document set on the image reading apparatus 200 and obtain image data. A read command is sent from the information processing apparatus to the image reading apparatus 200, and the read image data is saved in the disk apparatus 302.

At step 10003, the application software 401 determines the read image data. This process is a step unique to the present embodiment. For example, embedded copyright information is detected by detecting a digital watermark, a specific pattern or the like. Also, even if copyright information is not embedded, it is determined whether the read original document is an original document whose duplication should be restricted. Whether duplication of the original document should be restricted is determined by whether the image data is from published material, for example. In view of this, at step 10003, in the case where copyright information is not embedded, the following three determinations are performed.

1. It is determined whether halftone dots can be detected, assuming that a publication such as a magazine has been read. Detection of halftone dots is well-known technology, and involves, for example, contrasting the image data with a predefined halftone dot determination pattern and determining whether there is a halftone dot area.

2. It is determined whether the shadow of a binding portion can be detected, assuming that a bound publication has been read. The shadow of a binding portion is, for example, an object with an indistinct outline that extends linearly in a vertical or horizontal direction through a middle portion of the image data and whose density decrease in a gradated manner towards both sides with the binding line as the darkest portion. The image data is searched for such a pattern, and there is a match, it is determined that the image data includes a binding line.

3. It is determined whether the size of the original document is other than a standard paper size such as A4 size, assuming that a clipping was read from a publication. Because it is difficult to determine the original document size based only on image data, in order to perform this determination, the image reading apparatus 200 desirably is provided with a document sensor.

The above three determinations are performed, and if at least one of the conditions is determined to have been met, it is determined that there is a high possibility of the image data being a duplicate of a publication. Even in the case where copyright information is not included and the original document is not a publication, it should be assumed that copyrighted material on an original document is naturally copyrighted. However, because of the time and effort involved in notifying a warning in every case, in the present embodiment a warning is only notified with respect to image data that is clearly copyrighted due to the existence of copyright information and image data that is a duplicate of a publication.

In view of this, at step 10004, the application software 401 determines from the determination result of step 10003 that the operator needs to be notified about image data embedded with copyright information or image data that is highly likely to be a publication, and advances the processing to step 10005. If the operator does not need to be notified, the processing advances to step 10011. Step 10004 is unique to the present embodiment.

At step 10005, the operator logs in so as to be able to access the external storage server. In the case of performing image reading from the information processing apparatus 300, the operator operates the operation unit 306 and inputs a username (account name) and a password via a login screen displayed as shown in FIG. 10A on the display unit 305. Also, in the case of performing image reading from the image reading apparatus 200, the operator operates the operation unit 209, inputs a username (account name) via the login screen displayed as shown in FIG. 10B on the display unit 208, and then inputs a password via a password input screen displayed as shown in FIG. 10C. In the following description, it is assumed that the operator has successfully logged in as "User A".

At step 10006, the application software 401 obtains the users of the save location. In the case where the private directory was designated at step 10001, a list of users having access to the private directory in FIG. 6 is obtained. In the case where the public directory was designated at step 6001, a list of users having access to the public directory in FIG. 6 is obtained. At step 10007, the application software 401 investigates whether any users having access have been added after image transmission was last performed. Since there is no last transmission record when performing image transmission for the first time, the login user is assumed to be the only user that had access last time and is set as an initial value. Assuming that the save location of the record transmitted last time was the private directory, the record transmitted last time is read from the private directory, and it is investigated whether any users having access have been added.

For example, when there is a change from FIG. 7A to FIG. 7B or FIG. 7D or the like in the case where the public directory was designated at step 10001, the determination result is Yes since users having access have been added, and the processing advances to step 10008. On the other hand, in the case where there is a change from FIG. 7A to FIG. 7C, the determination result is No since users having access have decreased, and the processing advances to step 10011. Also, if the public directory, which is set to be accessible by users besides the login user, is designated when performing image transmission for the first time, the determination result will be Yes, and the processing advances to step 10008. Also, in the case where the private directory was designated at step 10001, the determination result is No since the login user is the only user having access at the time of the current transmission, and the processing advances to step 10011. In this processing, rather than simply investigating the increase or decrease in the number of users, the determination is performed in consideration of the case where persons that were not users last time have been added.

At step 10008, the application software 401 displays the notification to the user on the display unit 305. An example of the notification that is displayed on the display of the information processing apparatus at the time of performing image transmission for the first time if the public directory is designated is shown in FIG. 11A. Also, an example of the notification that is displayed on the display of the information processing apparatus when the users having access are changed from FIG. 7A to FIG. 7B is shown in FIG. 11B. The operator receives this notification, and presses OK if wanting to perform transmission even though users having access have been added, and Cancel if cancelling transmission.

At step 10009, the user receives the notification displayed at step 10008, and presses OK or Cancel. The processing advances to step 10010 in the case where OK is pressed, and is ended in the case where Cancel is pressed.

At step 10010, the application software 401 saves the list of the users having access that was obtained at step 10006 in the private directory on external storage as the transmitted record. By thus saving the record transmitted last time on the external storage, the same transmitted record can be used, even in the case where the user performs operations from another information processing apparatus not shown or where the user performs operations from another image reading apparatus not shown.

At step 10011, the application software 401 transmits the image to the directory set at step 10001.

There is no restriction on the order of steps 10003 and 10004 and steps 10005, 10006 and 10007, and processing may be implemented such that steps 10003 and 10004 are executed after first executing steps 10005, 10006 and step 10007.

Note that in the case where the private directory is designated as the transmission destination at step 10001, a configuration can be adopted in which the determination result of step 10004 is always No, and the processing of step 10003 is omitted. Alternatively, a configuration can be adopted in which the determination result of step 10007 is always No, and the processing of step 10006 is omitted.

Note that although the application software 401 and the driver software 402 that operate on the information processing apparatus 300 performed all of the image reading, saving and transmission processing, it is also possible to use the central processing unit 205, the program memory 206 and the work memory 207 mounted in the image reading apparatus 200, and to perform part or all of the processing with the image reading apparatus.

Note that although the list of users having access was saved in the private directory of the storage server 100 at step 10010, this was for the convenience of having one list of users approved by the user that is logged in, irrespective of what information processing apparatus or image reading apparatus is being used, and the determination processing of step 10007 can be executed, even if the user list is saved in the image reading apparatus 200 or in the information processing apparatus 300.

According to the above description, accidental release of read image data can be prevented while reducing unnecessary user notification by only confirming the transmission destination with the user in the case where the number of users has increased after image transmission was last performed. Furthermore, by targeting image data that includes copyright information or image data that is likely to be from a publication in performing the determination of whether any users having access have been added, the determination of users having access rights is omitted for image data with respect to which access is conceivably not restricted from the perspective of copyright. Thereby, notification that is most likely unnecessary can be omitted from notification relating to the addition of users having access.

Embodiment 3

Figure 13:
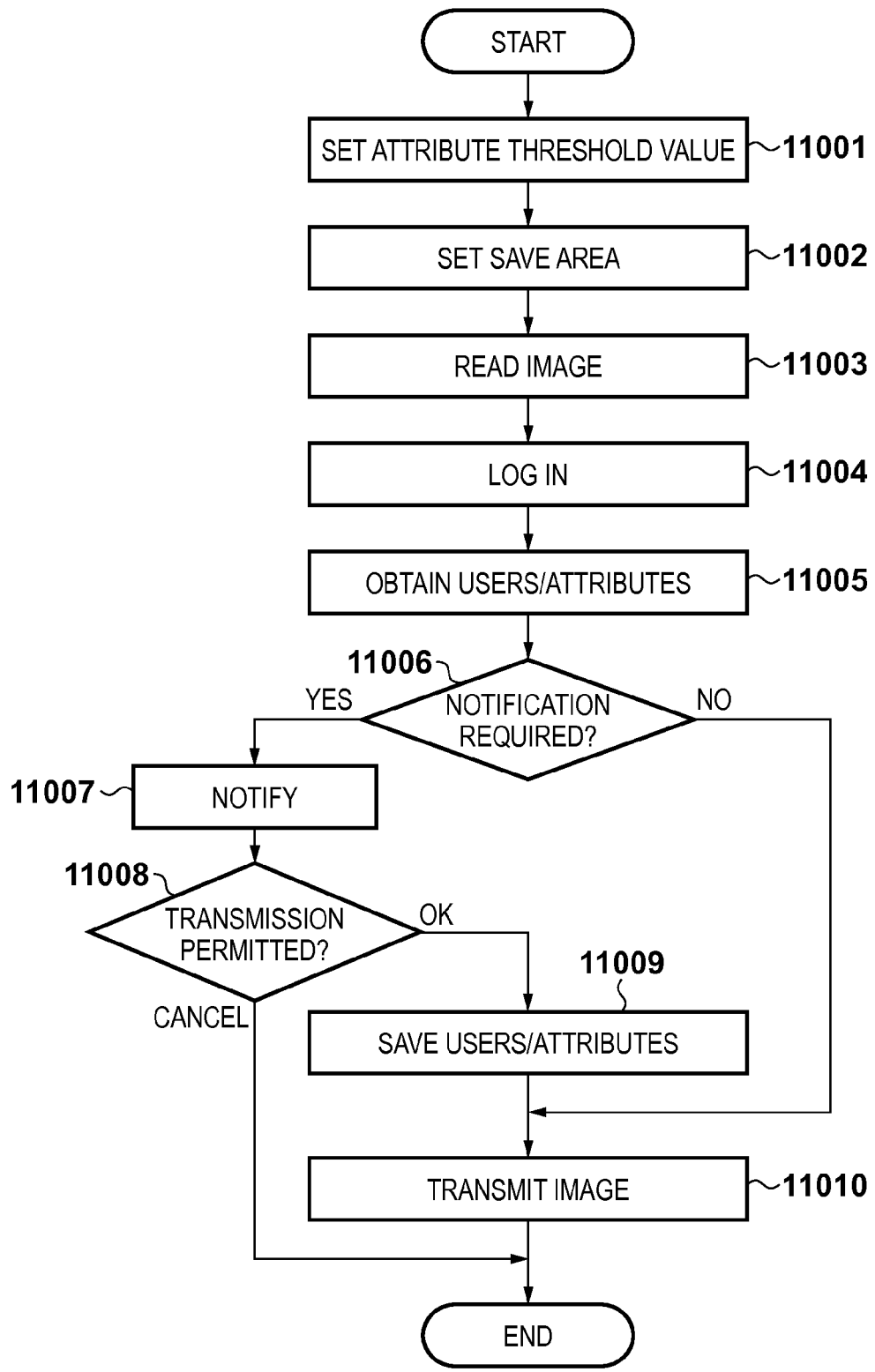
FIG. 13 is a flowchart for illustrating Embodiment 3.

The configuration of the present embodiment is similar to Embodiment 1, and description thereof will thus be omitted. In the present embodiment, finer notification control is performed by determining whether or not to notify the user, taking into consideration user attributes rather than only looking at the increase or decrease in users. In the following description, steps that are not described as being unique to the present embodiment are similar to corresponding steps in Embodiment 1. Accordingly, description of those steps will be simplified. The processing of the present embodiment will now be described using the flowchart of FIG. 13.

At step 11001, the user sets attributes or a threshold value of the attributes with respect to which notification is not required, based on attributes that can be set by the user, in the information processing apparatus 300 or the like. For example, settings are configured such that notification of a new user is not required if the attribute of the user is division chief or higher. The attribute "division chief" is a predefined attribute. Also, the meaning of "division chief or higher" is predefined as the relationship between attribute values. The user sets attributes or threshold values for attributes in accordance with this definition. The set attributes or threshold values are saved in a memory or the like. This step 11001 is a step unique to the present embodiment.

At step 11002, the operator designates the save location of a read image. In the case of performing image reading from the information processing apparatus 300, the operator operates the operation unit 306 and sets the save location via a settings screen displayed as shown in FIG. 9A on the display unit 305. In FIG. 9A, "Public" is shown as selected by being displayed in a highlighted manner, and the save location can be set to Public by pressing the "OK" button in this state.

In the case of performing image reading from the image reading apparatus 200, the operator operates the operation unit 209 and sets the save location via a settings screen displayed as shown in FIG. 9B on the display unit 208. In FIG. 9B, "Public" is shown as selected by adding "*" in front thereof, and the save location can be set to Public by pressing the "OK" button in this state.

At step 11003, the application software 401 and the driver software 402 read the original document set in the image reading apparatus and obtain image data. A read command is sent from the information processing apparatus to the image reading apparatus, and the read image is saved in the disk apparatus 302.

At step 11004, the operator logs in so as to be able to access the external storage server. In the case of performing image reading from the information processing apparatus 300, the operator operates the operation unit 306 and inputs a username (account name) and a password via the login screen displayed such as shown in FIG. 10A on the display unit 305. Also, in the case of performing image reading from the image reading apparatus 200, the operator operates the operation unit 209, inputs a username (account name) via the login screen displayed as shown in FIG. 10B on the display unit 208, and then inputs a password via a password input screen displayed as shown in FIG. 10C. In the following description, it is assumed that the operator has successfully logged in as "User A".

At step 11005, the application software 401 and the driver software 402 obtain users having access to the directory serving as the save location, and attribute thereof from the storage server 100. In the case where the private directory was designated at step 3001, a list of users having access to the private directory of FIGS. 14A to 14E is obtained. In the case where the public directory was designated at step 3001, a list of users having access to the public directory of FIGS. 14A to 14E is obtained. This step 11005 is a step unique to the present embodiment.

An attribute is set for the list of users having access shown in FIGS. 14A to 14E. Levels (Lv) are set for this attribute so as to enable comparison, with a higher level indicating the ability to access more information. The levels may be numbers so as to facilitate compare, or may be values whose order is determined by relative sizes. These levels are also called authority levels.

At step 11006, the application software 401 determines whether the user needs to be notified, based on the attribute of the users having access, after image transmission was last performed. This step 11006 is a step unique to the present embodiment in terms of also taking consideration of attributes.

Since there is no record transmitted last time when performing image transmission for the first time, the login user is assumed to be the only user having access last time and is set as an initial value. Assuming that the save location of the record transmitted last time is the private directory, the record transmitted last time is read from the private directory, and it is investigated whether any users having access have been added.

For example, if the public directory was designated at step 11002 and there is a change from FIG. 14A to FIG. 14B, User B has the highest ranked attribute due to a promotion or the like. In this case, User B's attribute has changed, without an increase in the number of users. Since the attribute has risen from Lv2 last time to Lv3, the determination result is No since the user does not need to be notified. Similarly, when there is a change from FIG. 14A to FIG. 14C, User B has the lowest ranking attribute due to retirement or the like. In this case, although the number of users has not increased, the User B's attribute has fallen from Lv2 last time to Lv0, and thus the determination result is Yes since the user needs to be notified. Similarly, when there is a change from FIG. 14A to FIG. 14D, User D that is a new user having authority in the organization is added. In this case, users have increased, but since User D, that is the new user, is a division chief and has an attribute of a level greater than or equal to the predetermined level set at step 11001, that is, greater than or equal to the predetermined attribute threshold value, the determination result is No since the user does not need to be notified. Similarly, when there is a change from FIG. 14A to FIG. 14E, a new employee User E is added. In this case, users have increased, and since User E, that is the new user, has an attribute of a level less than the attribute threshold value set at step 11001, the determination result is Yes since the user needs to be notified. In this way, even if a new user having access is not added, a warning notification will be given if the access authority of an existing user decreases. Also, in the case where a new user having access is added, a warning notification will also be given if the new user's access authority, which is the attribute, is less than a set value.

In this way, it is determined whether a user has access, according not only to the username but also to the authority of the user. In the case where it is determined on comparison with the record transmitted last time that a new user having access has been added, the login user is notified at step 11007.

At step 11007, the application software 401 displays notification to the user on the display unit 305 or the like. In FIG. 11A, an example of the notification that is displayed on the display of the information processing apparatus if the public directory is designated at the time of performing image transmission for the first time is shown. Also, in FIG. 11B, an example of the notification that is displayed on the display of the information processing apparatus when the users having access are changed from FIG. 7A to FIG. 7B is shown. The operator receives this notification, and presses OK in the case of wanting to perform transmission even though users having access have been added, and Cancel in the case of cancelling transmission.

At step 11008, the operator receives the notification displayed at step 11007, and presses OK or Cancel. The processing advances to step 11009 in the case where OK is pressed, and is ended in the case where Cancel is pressed.

At step 11009, the application software 401 saves a list of the users having access and a list of the attributes of the users that were obtained at step 11005 in the private directory on the external storage as the transmitted record. By thus saving the record transmitted last time on the external storage, the same transmitted record can be used, even in the case where the user performs operations from another information processing apparatus not shown or where the user performs operations from another image reading apparatus not shown.

At step 11010, the application software 401 transmits the image data to the directory set at step 11002.

Note that in the case where the private directory is designated as the transmission destination at step 11002, a configuration can be adopted in which the determination result of step 11006 is always No, and the processing of step 11005 is omitted.

Note that although the application software 401 and the driver software 402 that operate on the information processing apparatus 300 performed all of the image reading, saving and transmission processing, it is also possible to use the central processing unit 205, the program memory 206 and the work memory 207 mounted in the image reading apparatus 200, and to perform part or all of the processing with the image reading apparatus.

Note that although the list of users having access was saved in the private directory of the storage server 100 at step 11009, this was for the convenience of having one list of users approved by the user that is logged in, irrespective of what information processing apparatus or image reading apparatus is being used, and the determination processing of step 11006 can be executed, even if the user list is saved in the image reading apparatus 200 or in the information processing apparatus 300.

According to the above description, erroneous transmission of read images can be prevented while reducing unnecessary user notification by transmitting images after notifying the user and seeking permission, based on the user attributes when image transmission was last performed. Also, notification can be performed, with reference to the authority of users.

Embodiment 4

Figure 15:
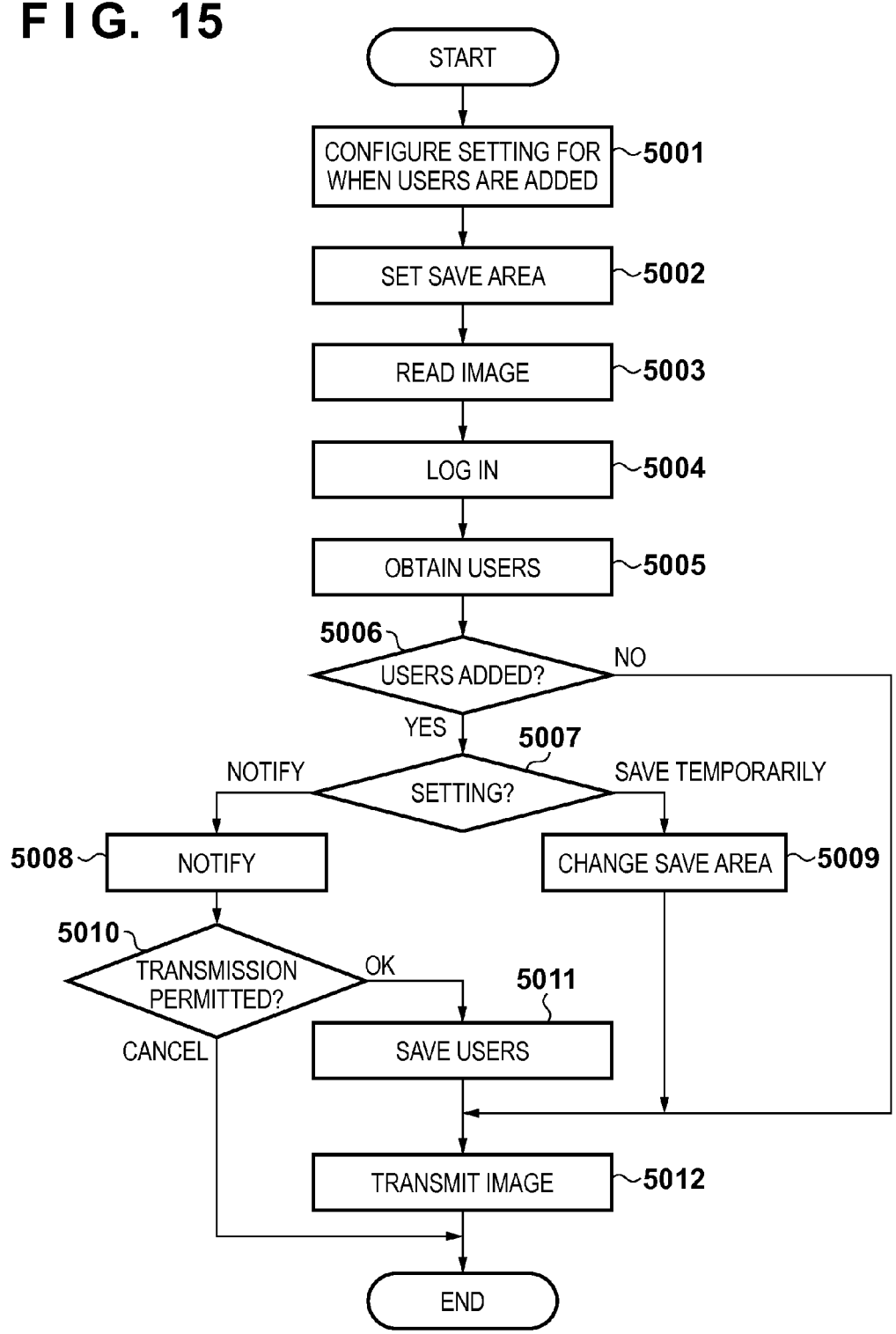
FIG. 15 is a flowchart for illustrating Embodiment 4.

The configuration of the present embodiment is similar to Embodiment 1, and description thereof will thus be omitted. In the present embodiment, image transmission is performed after selecting whether to be notified in advance or automatically transmit images to the private directory. In the following description, steps that are not described as being unique to the present embodiment are similar to corresponding steps in Embodiment 1. Accordingly, description of those steps will be simplified. The processing of the present embodiment will now be described using the flowchart of FIG. 15.

At step 5001, the settings for when a user having access to a directory that saves image data is added are configured on the information processing apparatus 300 by the operator. For example, the operator is made to select preferable settings, using a UI such as shown in FIG. 16. An option 4001 is to perform image transmission after notifying the operator before transmission that users having access have increased and obtaining the approval of the login user. An option 4002 is to perform image transmission after automatically changing the transfer designation to the private directory. Note that although this processing comes at the head of the flowchart for convenience, it does not need to be performed every time, and once the user has configured the settings, subsequent operations are performed using the same settings. In the case where it is determined at the after-mentioned step 5006 that a user having access to a directory that saves image data has been added, operations are performed in accordance with the settings configured in this step. Note that this step is unique to the present embodiment.

At step 5002, the operator designates the save location of a read image. In the case of performing image reading from the information processing apparatus 300, the operator operates the operation unit 306 and sets the save location via a settings screen displayed as shown in FIG. 9A on the display unit 305. In FIG. 9A, "Public" is shown as selected by being displayed in a highlighted manner, and the save location can be set to Public by pressing the "OK" button in this state. Also, in the case of performing image reading from the image reading apparatus 200, the operator operates the operation unit 209 and sets the save location via a settings screen displayed as shown in FIG. 9B on the display unit 208. In FIG. 9B, "Public" is shown as selected by adding "*" in front thereof, and the save location can be set to Public by pressing the "OK" button in this state.

At step 5003, the application software 401 and the driver software 402 read the original document set in the image reading apparatus and obtain image data. A read command is sent from the information processing apparatus to the image reading apparatus, and the read image is saved in the disk apparatus 302.

At step 5004, the operator logs in so as to be able to access the external storage server. In the case of performing image reading from the information processing apparatus 300, the operator operates the operation unit 306 and inputs a username (account name) and a password via the login screen displayed such as shown in FIG. 10A on the display unit 305. Also, in the case of performing image reading from the image reading apparatus 200, the operator operates the operation unit 209, inputs a username (account name) via the login screen displayed as shown in FIG. 10B on the display unit 208, and then inputs a password via a password input screen displayed as shown in FIG. 10C. In the following description, it is assumed that the operator has successfully logged in as "User A".

At step 5005, the application software 401 and the driver software 402 obtain users of the save location. In the case where the private directory was designated at step 5002, a list of users having access to the private directory in FIG. 6 is obtained. In the case where the public directory was designated at step 5002, a list of users having access to the public directory in FIG. 6 is obtained.

At step 5006, the application software 401 and the driver software 402 investigate whether any users having access have been added or whether the attribute of any users has decreased after image transmission was last performed. Since there is no record transmitted last time when performing image transmission for the first time, the login user is assumed to be the only user that had access last time and is set as an initial value. Assuming that the save location of the record transmitted last time is the private directory, the record transmitted last time is read from the private directory, and it is investigated whether any users having access have been added.

For example, when there is a change from FIG. 7A to FIG. 7B or FIG. 7D or the like in the case where the public directory was designated at step 5002, the determination result is Yes since users have been added, and the processing advances to step 5007. On the other hand, in the case where there is a change from FIG. 7A to FIG. 7C, the determination result is No since users having access have decreased, and the processing advances to step 5012. Also, if the public directory, which is set to be accessible by users besides the login user, is designated when performing image transmission for the first time, the determination result will be Yes, and the processing advances to step 5007. Also, in the case where the private directory was designated at step 5002, the determination result is No since the login user is the only user having access at the time of the current transmission, and the processing advances to step 5012. In this processing, determination is performed in consideration of the case where persons that were not users last time have been added, rather than simply investigating the increase or decrease in the number of users.

At step 5007, the application software 401 and the driver software 402 determine whether the user has selected via the UI in FIG. 16 to be notified before transmission or to transmit and save image data to the private directory. If the option 4001, that is, to be notified before transmission, is selected, the processing advances to step 5008, and if the option 4002, that is, transmission and saving of image data to the private directory, is selected, the processing advances to step 5009. Note that this step is unique to the present embodiment. The processing from this step onwards is similar to the processing from step 3007 onwards in FIG. 8.

At step 5008, the application software 401 displays notification to the user on the display unit 305, similarly to step 11007. An example of the notification that is displayed on the display of the information processing apparatus if the public directory is designated at the time of performing image transmission for the first time is shown in FIG. 11A. Also, an example of the notification that is displayed on the display of the information processing apparatus when the users having access change from FIG. 7A to FIG. 7B is shown in FIG. 11B. The user receives this notification, and presses OK in the case of wanting to perform transmission even though users having access have been added, and Cancel in the case of cancelling transmission.

At step 5009, the application software 401 automatically changes the save location to the private directory. Thereby, confidentiality can be maintained by performing transmission to the private directory which can only be accessed by the login user, without notifying the user or receiving the user's confirmation beforehand.

At step 5010, the user receives the notification displayed at step 5008, and presses OK or Cancel. The processing advances to step 5011 in the case where OK is pressed, and is ended in the case where Cancel is pressed.

At step 5011, the application software 401 saves the list of users having access that was obtained at step 5005 in the private directory on the external storage as the transmitted record. By thus saving the record transmitted last time on the external storage, the same transmitted record can be used, even in the case where the user performs operations from another information processing apparatus not shown or where the user performs operations from another image reading apparatus not shown.

At step 5012, the application software 401 transmits the image to the directory that has been set. In the case where the processing does not pass through step 5009, the image is transmitted to the directory set at step 5002. In the case where the processing passes through step 5009, the image is transmitted to the private directory set at step 5009.

Note that in the case where settings are configured at step 5002 so as to set the private directory as the transmission destination, a configuration can be adopted in which the determination result of step 5006 is always No, and the processing of step 5005 is omitted.

Note that although the application software 401 and the driver software 402 that operate on the information processing apparatus 300 performed all of the image reading, saving and transmission processing, it is also possible to use the central processing unit 205, the program memory 206 and the work memory 207 mounted in the image reading apparatus 200, and to perform part or all of the processing with the image reading apparatus.

Note that although the list of users having access was saved in the private directory of the storage server 100 at step 5011, this was for the convenience of having one list of users approved by the user that is logged in, irrespective of what information processing apparatus or image reading apparatus is being used, and the determination processing of step 5006 can be executed, even if the list is saved in the image reading apparatus 200 or in the information processing apparatus 300.

As described in the above description, the only case where image transmission is performed after notifying the user and seeking his or her permission is when a user having access that was not registered when an image was last transmitted is newly added and settings indicating that the user is to be notified beforehand have been configured. On the other hand, if the settings have been configured such that transmission to the private directory is performed even when a new user having access has been added, the image is transmitted to the private directory and saved, without notifying the user beforehand. Erroneous transmission of read images can thus be prevented while reducing unnecessary user notification.

Embodiment 5

Figure 17:
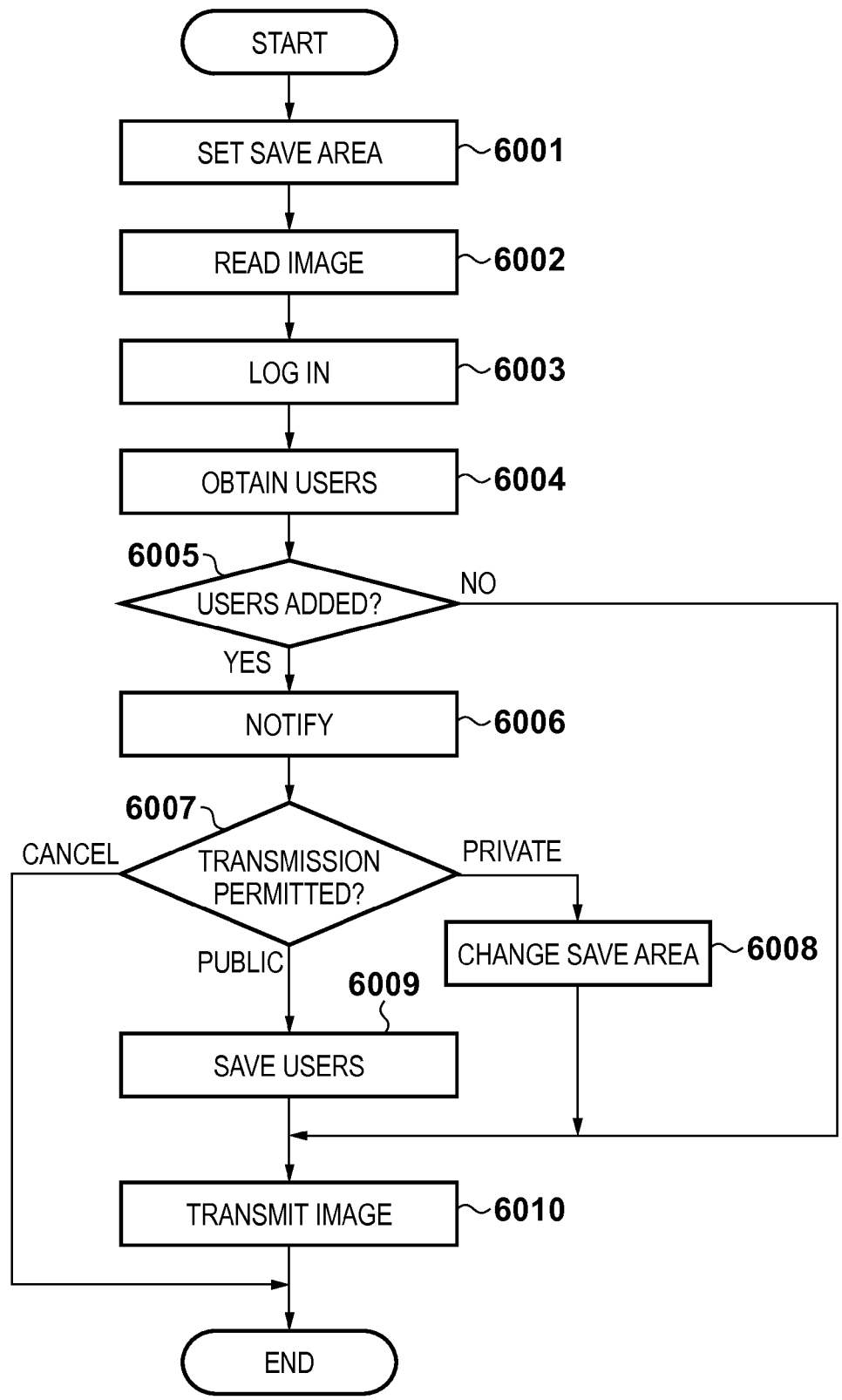
FIG. 17 is a flowchart for illustrating Embodiment 5.

The configuration of the present embodiment is similar to Embodiment 1, and description thereof will thus be omitted. In the present embodiment, the user is made to choose the transmission destination of image data at the time of notifying the user that users having access have been added, and image data is transmitted to the selected save area. In the following description, steps that are not described as being unique to the present embodiment are similar to corresponding steps in Embodiment 1. Accordingly, description of those steps will be simplified. The processing of the present embodiment will now be described using the flowchart of FIG. 17.

At step 6001, the user designates the save location of a read image. In the case of performing image reading from the information processing apparatus 300, the user operates the operation unit 306 and sets the save location via a settings screen displayed as shown in FIG. 9A on the display unit 305. In FIG. 9A, "Public" is shown as selected by being displayed in a highlighted manner, and the save location can be set to Public by pressing the "OK" button in this state.

In the case of performing image reading from the image reading apparatus 200, the operator operates the operation unit 209 and sets the save location via a settings screen displayed as shown in FIG. 9B on the display unit 208. In FIG. 9B, "Public" is shown as selected by adding "*" in front thereof, and the save location can be set to Public by pressing the "OK" button in this state.

At step 6002, the application software 401 and the driver software 402 read the original document set in the image reading apparatus and obtain image data. A read command is sent from the information processing apparatus to the image reading apparatus, and the read image is saved in the disk apparatus 302.

At step 6003, the user logs in so as to be able to access the external storage server. In the case of performing image reading from the information processing apparatus 300, the operator operates the operation unit 306 and inputs a username (account name) and a password via the login screen displayed such as shown in FIG. 10A on the display unit 305. Also, in the case of performing image reading from the image reading apparatus 200, the operator operates the operation unit 209, inputs a username (account name) via the login screen displayed as shown in FIG. 10B on the display unit 208, and then inputs a password via a password input screen displayed as shown in FIG. 10C. In the following description, it is assumed that the operator has successfully logged in as "User A".

At step 6004, the application software 401 obtains the users of the save location. In the case where the private directory was designated at step 6001, a list of users having access to the private directory in FIG. 6 is obtained. In the case where the public directory was designated at step 6001, a list of users having access to the public directory in FIG. 6 is obtained.

At step 6005, the application software 401 investigates whether any users having access have been added after image transmission was last performed. Since there is no record transmitted last time when performing image transmission for the first time, the login user is assumed to be the only user having access last time and is set as an initial value. Assuming that the save location of the record transmitted last time is the private directory, the record transmitted last time is read from the private directory, and it is investigated whether any users having access have been added.

For example, when there is a change from FIG. 7A to FIG. 7B or FIG. 7D or the like in the case where the public directory was designated at step 6001, the determination result is Yes since users having access have been added, and the processing advances to step 6006. On the other hand, in the case where there is a change from FIG. 7A to FIG. 7C, the determination result is No since users having access have decreased, and the processing advances to step 6010. Also, if the public directory, which is set to be accessible by users besides the login user, is designated when performing image transmission for the first time, the determination result will be Yes, and the processing advances to step 6006. Also, in the case where the private directory was designated at step 6001, the determination result is No since the login user is the only user having access at the time of the current transmission, and the processing advances to step 6010. In this processing, the determination is performed in consideration of the case where new users having access have been added, rather than simply investigating the increase or decrease in the number of users.

At step 6006, the application software 401 displays notification to the user on the display unit 305. In FIG. 18, an example of the notification that is displayed on the display of the information processing apparatus in the case where the users having access change from FIG. 7A to FIG. 7B is shown. The operator receives this notification, and can choose the private directory or the public directory as the transmission destination or can cancel transmission.

At step 6007, the operator receives the notification of step 6006, and if the addition of users having access is a problem, in the case of performing transmission to the external storage server, the operator selects transmission to the private directory and presses OK. At this time, the processing advances to step 6008. If the addition of users having access is not a problem, the operator selects transmission to the public directory and presses OK. At this time, the processing advances to step 6009. The operator presses Cancel in the case of cancelling transmission. At this time, the processing is ended. At step 6008, the application software 401 changes the save location to the private directory. Thereby, even if there is an increase in users when transmitting to the public directory and performing image transmission is problematic, it is possible to transmit the image to the external storage server while maintaining confidentiality, by performing transmission to the private directory which can only be accessed by the user.

At step 6009, the application software 401 saves the list of users having access that was obtained at step 6004 in the private directory on the external storage as the transmitted record. By thus saving the record transmitted last time on the external storage, the same transmitted record can be used, even in the case where the user performs operations from another information processing apparatus not shown or where the user performs operations from another image reading apparatus not shown.

At step 6010, the application software 401 transmits the image to the directory that has been set. In the case where the processing does not pass through step 6008, the image is transmitted to the directory set at step 6001. In the case where the processing passes through step 6008, the image is transmitted to the private directory set at step 6008.

Note that in the case where the private directory is designated as the transmission destination at step 6001, a configuration can be adopted in which the determination result of step 6005 is always No, and the processing of step 6004 is omitted.

Note that although the application software 401 and the driver software 402 that operate on the information processing apparatus 300 performed all of the image reading, saving and transmission processing, it is also possible to use the central processing unit 205, the program memory 206 and the work memory 207 mounted in the image reading apparatus 200, and to perform part or all of the processing with the image reading apparatus.

Note that although the list of users having access was saved in the private directory of the storage server 100 at step 6009, this was for the convenience of having one list of users approved by the user that is logged in, irrespective of what information processing apparatus or image reading apparatus is being used, and the determination processing of step 6005 can be executed, even if the user list is saved in the image reading apparatus 200 or in the information processing apparatus 300.

According to the above description, erroneous transmission of read images can be prevented while reducing unnecessary user notification, by only confirming the transmission destination with the operator in the case where new users having access are added after an image was last transmitted.

Embodiment 6

The configuration of the present embodiment is similar to Embodiment 1, and description thereof will thus be omitted. In the present embodiment, image transmission is only performed with an image reading apparatus, and an information processing apparatus is not used. In the following description, steps that are not described as being unique to the present embodiment are similar to corresponding steps in Embodiment 1. Accordingly, description of those steps will be simplified. The processing of the present embodiment will now be described using the flowchart of FIG. 19.

At step 17001, the operator designates the save location of a read image. The operator operates the operation unit 209 of the image reading apparatus 200, and sets the save location via a settings screen displayed as shown in FIG. 9B on the display unit 208. In FIG. 9B, "Public" is shown as selected by adding "*" in front thereof, and the save location can be set to Public by pressing the "OK" button in this state.

At step 17002, the image reading apparatus 200 reads an original document set in the scanner unit and obtains image data.

At step 17003, the operator logs in so as to be able to access the external storage server. The operator operates operation unit 209 of the image reading apparatus 200, inputs a username (account name) via the login screen displayed as shown in FIG. 10B on the display unit 208, and then inputs a password via a password input screen displayed as shown in FIG. 10C. In the following description, it is assumed that the operator has successfully logged in as "User A".

At step 17004, the image reading apparatus 200 obtains the users of the save location. In the case where the private directory was designated at step 17001, a list of users having access to the private directory in FIG. 6 is obtained. In the case where the public directory was designated at step 17001, a list of users having access to the public directory in FIG. 6 is obtained.

At step 17005, the image reading apparatus 200 investigates whether any users having access have been added or whether the attribute of any users has decreased after image transmission was last performed. Since there is no record transmitted last time when performing image transmission for the first time, the login user is assumed to be the only user having access last time and is set as an initial value. Assuming that the save location of the record transmitted last time is the private directory, the record transmitted last time is read from the private directory, and it is investigated whether any users having access have been added.

For example, when there is a change from FIG. 7A to FIG. 7B or FIG. 7D or the like in the case where the public directory was designated at step 17001, the determination result is Yes since users have been added, and the processing advances to step 17006. On the other hand, in the case where there is a change from FIG. 7A to FIG. 7C, the determination result is No since users having access have decreased, and the processing advances to step 17008. Also, if the public directory, which is set to be accessible by users besides the login user, is designated when performing image transmission for the first time, the determination result will be Yes, and the processing advances to step 17006. Also, in the case where the private directory was designated at step 17001, the determination result is No since the login user is the only user having access at the time of the current transmission, and the processing advances to step 17008. In this processing, the determination is performed in consideration of the case where users having access that were not users last time have been added, rather than simply investigating the increase or decrease in the number of users.

At step 17006, the image reading apparatus 200 automatically changes the save location to the private directory. Thereby, even if the operator is operating from an image reading apparatus and confirming the users having access is difficult, confidentiality can be maintained by performing transmission to the private directory which can only be accessed by the login user.

At step 17007, the image reading apparatus 200 saves the list of users that was obtained at step 17004 in the private directory on the external storage as the transmitted record. By thus saving the record transmitted last time on the external storage, the same transmitted record can be used, even in the case where the user performs operations from the information processing apparatus 300 or where the user performs operations from another image reading apparatus not shown.

At step 17008, the image reading apparatus 200 transmits the image to the directory that has been set. In the case where the processing does not pass through step 17006, the image is transmitted to the directory set at step 17001. In the case where the processing passes through step 17006, the image is transmitted to the private directory set at step 17006.

Note that in the case where the private directory is designated as the transmission destination at step 17001, a configuration can be adopted in which the determination result of step 17005 is always No, and the processing of step 17004 is omitted.

Note that although the list of users having access was saved in the private directory of the storage server 100 at step 17007, this was for the convenience of having one list of users approved by the user that is logged in, irrespective of what information processing apparatus or image reading apparatus is being used, and the determination processing of step 17005 can be executed with the list saved in the image reading apparatus 200.

According to the above description, in the case where new users having access that were not registered when image data was last transmitted have been added, the transmission destination of the image data is automatically changed to the private directory, and the image data is transmitted. Thereby, erroneous transmission of read images can be prevented while eliminating unnecessary notification.

Variations

In the above embodiments, the configurations are all based on Embodiment 1, and the image reading apparatus 200 was not configured to log in to the storage server 100 alone and uploads image data. However, if an application program having functions equivalent to the application software 401 is installed in the image reading apparatus 200, and the image reading apparatus is provided with the functions of the application software 401, in all the above embodiments, reading and uploading of image data that is performed by operating the image reading apparatus 200 can be realized without the mediation of the information processing apparatus 300. In this case, the processing shown in the flowchart that is all executed based on operations of the image reading apparatus 200 is executed by the image reading apparatus 200.

In the above embodiments, the access range settings of the directory that saves image data at this time, such as a list of usernames, user-specific attributes or the like, is saved in the private directory of the user of the storage server 100 at the time of transmission of image data. However, provided that the save area is accessible by the login user, the present invention is not limited to the private directory.

Other Embodiments

Aspects of the present invention can also be realized by a computer of a system or apparatus (or devices such as a the CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269781, filed Dec. 10, 2012, which is hereby incorporated by reference herein in its entirety.

What is claimed is:

1. A system for transmitting image data to a server for saving image data into a save area, comprising:
   an obtainment unit configured to obtain from the server before transmitting image data to the server, a current access restriction setting of a save area chosen by a user who is a transmitter of the image data, the save area being accessible by users specified based on an access restriction setting;
   a notification unit configured to compare a previous access restriction setting with the current access restriction setting, and output notification to the user if the current access restriction setting is less restrictive than the previous access restriction setting; and
   a transmission unit configured to transmit the image data to the server.

2. The system according to claim 1, further comprising:
   a unit configured to receive input of a selection by a user as to whether to perform image data transmission or cancel image data transmission,
   wherein, if it is selected to perform image data transmission, the image data is transmitted by the transmission unit, and the current access restriction setting is stored as the previous access restriction setting.

3. The system according to claim 1, wherein the obtainment unit obtains the previous access restriction setting from the server together with the current access restriction setting.

4. The system according to claim 3,
   wherein the access restriction setting of the save area is described as a list of usernames or a range of users that are permitted to access the save area, and is saved in the save area.

5. The system according to claim 1, further comprising:
   a unit configured to detect copyright information included in image data or determines whether image data is a duplicate of a publication,
   wherein, if copyright information included in image data to be transmitted is not detected and it is not determined that the image data is a duplicate of a publication, the image data is transmitted by the transmission unit and saved in a save area of the server.

6. The system according to claim 1,
   wherein the access restriction setting of the save area is described as a list of usernames that are permitted to access the save area and as an authority level of each user,
   if there is a user whose authority level has decreased in the current access restriction setting relative to the authority level included as the previous access restriction setting, it is determined that the current access restriction setting is less restrictive than the previous access restriction setting, and
   even if a new user has been added in the current access restriction setting relative to the previous access restriction setting, it is not determined that the current access restriction setting is less restrictive than the previous access restriction setting, if the authority level of the added user is greater than or equal to a predetermined level.

7. The system according to claim 1, further comprising:
   a unit configured to configure in advance, in the current access restriction setting, an operation setting for a case where the current access restriction setting is less restrictive than the previous access restriction setting,
   wherein, if it is determined by the notification unit that the current access restriction setting is less restrictive than the previous access restriction setting, notification is output to the user or transmission is performed by the transmission unit after setting a save area that is only accessible by the user as a new save area of the image data, according to the operation setting.

8. The system according to claim 1, further comprising:
   a unit configured to receive a selection by the user to cancel transmission of the image data, to transmit the image data without changing the save area of the image data, or to perform transmission by the transmission unit after setting a save area that is only accessible by the user as a new save area of the image data, according to the notification to the user,
   wherein transmission of the image data is performed according to the selection.

9. The system according to claim 1, wherein the transmission unit transmits the image data to an area that is only accessible by the user instead of the save area chosen by the user, if the current access restriction setting is less restrictive than the previous access restriction setting, and transmits the image data to the save area chosen by the user if the current access restriction setting is not less restrictive than the previous access restriction setting.

10. The system according to claim 1 constructed of a single apparatus.

11. A method for transmitting image data to a server for saving image data into a save area, the method comprising:
   obtaining from the server before transmitting image data to the server, a current access restriction setting of a save area chosen by a user who is a transmitter of the image data, the save area being accessible by users specified based on an access restriction setting;
   comparing a previous access restriction setting with the current access restriction setting;
   outputting notification to the user if the current access restriction setting is less restrictive than the previous access restriction setting; and
   transmitting the image data to the server.

12. A non-transitory computer readable medium storing program which causes a computer to execute a method, the method comprising:
   obtaining from the server before transmitting image data to the server, a current access restriction setting of a save area chosen by a user who is a transmitter of the image data, the save area being accessible by users specified based on an access restriction setting;
   comparing a previous access restriction setting with the current access restriction setting;
   outputting notification to the user if the current access restriction setting is less restrictive than the previous access restriction setting; and
   transmitting the image data to the server.

* * * * *